(12) United States Patent
Grechanik et al.

(10) Patent No.: US 9,021,416 B2
(45) Date of Patent: Apr. 28, 2015

(54) RECOMMENDED APPLICATION EVALUATION SYSTEM

(75) Inventors: Mark Grechanik, Chicago, IL (US); Qing Xie, Chicago, IL (US); Chen Fu, Lisle, IL (US)

(73) Assignee: Accenture Global Service Limited, Dublin (IE)

( * ) Notice: Subject to any disclaimer, the term of this patent is extended or adjusted under 35 U.S.C. 154(b) by 1041 days.

(21) Appl. No.: 12/268,168

(22) Filed: Nov. 10, 2008

(65) Prior Publication Data

US 2009/0138898 A1 May 28, 2009

Related U.S. Application Data

(63) Continuation-in-part of application No. 11/804,030, filed on May 16, 2007.

(51) Int. Cl.
   *G06F 9/44* (2006.01)

(52) U.S. Cl.
   CPC ... *G06F 8/36* (2013.01); *G06F 8/20* (2013.01)

(58) Field of Classification Search
   USPC ......................................................... 717/100
   See application file for complete search history.

(56) References Cited

U.S. PATENT DOCUMENTS

| | | | |
|---|---|---|---|
| 6,065,035 A * | 5/2000 | Shulman et al. | 718/100 |
| 6,816,855 B2 * | 11/2004 | Hartel et al. | 1/1 |
| 6,931,625 B1 * | 8/2005 | Coad et al. | 717/109 |
| 7,472,118 B2 * | 12/2008 | Hirst | 1/1 |
| 7,529,744 B1 * | 5/2009 | Srivastava et al. | 1/1 |
| 7,631,294 B2 * | 12/2009 | Rush et al. | 717/111 |
| 7,698,695 B2 * | 4/2010 | Ganesh et al. | 717/143 |
| 7,747,613 B2 * | 6/2010 | Freeman et al. | 707/722 |
| 7,752,207 B2 * | 7/2010 | Buzsaki et al. | 707/737 |
| 7,870,116 B2 * | 1/2011 | Olsen | 707/705 |
| 7,890,919 B1 * | 2/2011 | Williams | 717/100 |
| 2002/0087944 A1 * | 7/2002 | David | 717/100 |
| 2002/0170032 A1 * | 11/2002 | Beaven et al. | 717/104 |
| 2003/0014415 A1 * | 1/2003 | Weiss et al. | 707/10 |
| 2003/0056192 A1 * | 3/2003 | Burgess | 717/100 |
| 2004/0031016 A1 | 2/2004 | Vaidyanathan et al. | |
| 2004/0172612 A1 * | 9/2004 | Kasravi et al. | 717/101 |
| 2005/0246588 A1 * | 11/2005 | Deng et al. | 714/38 |
| 2005/0262056 A1 * | 11/2005 | Hamzy et al. | 707/3 |
| 2006/0206454 A1 * | 9/2006 | Forstall et al. | 707/3 |

(Continued)

OTHER PUBLICATIONS

Stylos J. Myers: "Mica: a Web-search tool for finding API components and examples" IEEE Symposium on Visual Languages and Human-Centric Computing IEEE Comput. Soc Los Alamitos, CA, USA, Sep. 2006, p. 8, ISBN 0-7695-2586-5.*

(Continued)

*Primary Examiner* — Matthew Brophy
(74) *Attorney, Agent, or Firm* — Brinks Gilson & Lione

(57) ABSTRACT

A code evaluation tool greatly reduces time, cost, and other resource expenditures needed to validate that an application implements desired functionality. The tool is a search, navigation and visualization tool that accepts high-level processing concepts as inputs to identify, rank, and return the code of a recommended application. A software developer may use the tool to validate that functional requirements are met by the recommended application. The tool provides an efficient way to improve the evaluation of application logic to validate that the application meets specified functional requirement and implements the desired high-level processing concepts.

21 Claims, 14 Drawing Sheets

(56) References Cited

U.S. PATENT DOCUMENTS

| | | | |
|---|---|---|---|
| 2006/0265417 A1* | 11/2006 | Amato et al. | 707/102 |
| 2007/0050343 A1* | 3/2007 | Siddaramappa et al. | 707/3 |
| 2007/0050358 A1* | 3/2007 | Ganesh et al. | 707/6 |
| 2007/0112817 A1* | 5/2007 | Danninger | 707/101 |
| 2007/0198340 A1* | 8/2007 | Lucovsky et al. | 705/14 |
| 2007/0208709 A1* | 9/2007 | Annand et al. | 707/3 |
| 2007/0250810 A1* | 10/2007 | Tittizer et al. | 717/110 |
| 2007/0256054 A1* | 11/2007 | Byrne et al. | 717/113 |
| 2007/0261036 A1* | 11/2007 | Drake et al. | 717/136 |
| 2007/0299825 A1* | 12/2007 | Rush et al. | 707/3 |
| 2008/0046407 A1* | 2/2008 | Shah et al. | 707/3 |
| 2008/0072210 A1* | 3/2008 | Rush et al. | 717/121 |
| 2008/0244505 A1* | 10/2008 | Smilowitz et al. | 717/100 |
| 2008/0263518 A1* | 10/2008 | Bank et al. | 717/120 |
| 2009/0138898 A1 | 5/2009 | Grechanik et al. | |
| 2011/0138350 A1* | 6/2011 | Naik et al. | 717/100 |

OTHER PUBLICATIONS

Renuka Sindhgatta. 2006. Using an information retrieval system to retrieve source code samples. In Proceedings of the 28th international conference on Software engineering (ICSE '06). ACM, New York, NY, USA, 905-908.*

Xie, Xinrong, Denys Poshyvanyk, and Andrian Marcus. "3D visualization for concept location in source code." Proceedings of the 28th international conference on Software engineering. ACM, 2006.*

Thummalapenta, Suresh, and Tao Xie. "Parseweb: a programmer assistant for reusing open source code on the web." Proceedings of the twenty-second IEEE/ACM international conference on Automated software engineering. ACM, 2007.*

Garcia, Vinicius Cardoso, et al. "From specification to experimentation: a software component search engine architecture." Component-Based Software Engineering. Springer Berlin Heidelberg, 2006. 82-97.*

Garcia, Vinicius C., et al. "Toward a code search engine based on the state-of-art and practice." Software Engineering Conference, 2006. APSEC 2006. 13th Asia Pacific. IEEE, 2006.*

Thummalapenta, Suresh, and Tao Xie. "SpotWeb: Detecting framework hotspots and coldspots via mining open source code on the web." Automated Software Engineering, 2008. ASE 2008. 23rd IEEE/ACM International Conference on. IEEE, 2008.*

Grechanik et al., "Evaluating Recommended Applications," RSSE '08, Nov. 10, 2008, Atlanta, Georgia, three pages.

Stylos, "Mica: A Web-Search Tool for Finding API Components and Examples", Visual Languages and Human-Centric Computing (VL-HCC"06), Sep. 9, 2006, pp. 1-8.

* cited by examiner

RECOMMENDED APPLICATION EVALUATION SYSTEM

CROSS REFERENCE TO RELATED APPLICATIONS

This application is a continuation in part of U.S. patent application Ser. No. 11/804,030, filed May 16, 2007, which is incorporated herein by reference in its entirety.

BACKGROUND OF THE INVENTION

1. Technical Field

This disclosure concerns evaluating applications identified as implementing desired functionality. In particular, this disclosure relates to a search, navigation and visualization tool that accepts high-level processing concepts as inputs that drive a multi-layered search of an application to validate that the logic of the application actually does implement desired functionality.

2. Background Information

Software professionals widely recognize that applications often fail to implement functionality as described by the application descriptions and project summaries of the applications. Software professionals use various inadequate techniques to reduce the time, money, and other costs for validating that an application implements particular functionality. Software professionals recognize API calls as forms of abstraction for high-level processing concepts, and merely search for the existence of particular API calls to validate that the application implements a desired functionality. For example, an API call may be identified and/or described as implementing pull-down menu functionality, although the underlying logic may not actually include the logic necessary to deliver the functionality of a pull-down menu. Current logic evaluation techniques and tools require significant resources and user expertise to accurately validate that an application implements functional requirements in support of high-level processing concepts. Modern search engines do not ensure that the logic of applications identified by the search engines actually implement the functionality as described by the project summaries and documentation of the application.

Software professionals consider the mismatch between the high-level processing concepts (e.g., the intent reflected in the descriptions of applications) and low-level implementation details (e.g., API calls and actual run-time behaviour) found in application logic a fundamental technical challenge to validating that an application implements particular functionality. Software professionals intend to author meaningful descriptions of applications, in the course of depositing applications into software repositories. The mismatch between the description of an application and the actual behaviour of the application represents one example of the "vocabulary problem", which states that no single word or phrase best describes a programming concept.

In the spiral model of software development, stakeholders describe high-level processing concepts to development teams, and together the stakeholders and development teams identify requirements in support of the high-level processing concepts. In addition, a development team builds a prototype based on the requirements, and the development team demonstrates the prototype to the stakeholders to receive feedback. Prototypes attempt to approximate the desired high-level processing concepts (e.g., features and capabilities) of the new application stakeholders desire development teams to build. The feedback from stakeholders often leads to changes to the prototype and the original requirements, as stakeholders iteratively refine their vision. In the event the stakeholders make a substantial number of changes to the requirements, the development team often discards the prototype and builds a new prototype, and another iteration of refinements repeats. Building prototypes repeatedly without reusing existing application logic costs organizations a great deal in the form of wasted project resources and time. Deploying an application without adequately evaluating and validating that the logic of the application implements desired functionality further complicates software development.

Development teams find the task of evaluating and validating that the logic of an application approximates high-level processing concepts and requirements of a software project resource intensive. In the context of application deployment, software development professionals consider such application logic as highly relevant application logic (HRAL). Many application repositories (e.g., open source repositories and source control management systems maintained by stakeholders internally) contain hundreds of thousands of different existing applications (e.g., potential highly relevant applications (HRAs)). Unfortunately, developers find it difficult to validate the logic of applications, because of the time and expense involved in searching the application, evaluating and validating that the logic of the application implements particular functionality.

The amount of intellectual effort that a developer must expend to move a software system from one stage of development to another may be considered the "cognitive distance". For example, using current search tools, developers expend significant intellectual effort to validate that an application implements desired functionality. Many developers employ search engines that identify exact matches between keywords that are entered as part of the search query and the words found in an application. The application may include descriptions, application logic comments, program variables names, and variable types of the application. Such search engines actually increase the difficulty of validating the application, because of the poor quality of information contained in application, and the inability to reduce the cognitive distance required to validate that the logic of the application implements the desire functionality, as well as other factors. Additionally, many applications include incomplete, misleading and inaccurate descriptions of the application. Consequently, even matching keywords with words found in the application description does not guarantee that the search engine will identify application logic that actually implements desired functionality (e.g., highly relevant application logic (HRAL)).

Effective software evaluation techniques reduce the cognitive distance between the initial concept of a system (e.g., high-level processing concepts that expressly and implicitly describe the features and capabilities of an application), validating discrete requirements, and the production implementation of the application. Unfortunately, current application evaluation tools lack the ability to reduce the cognitive distance related to validating application logic to identify HRAL.

For example, an application description may indicate that an application includes an encryption feature when in fact the application uses compression as a crude form of encryption. A developer entering "encryption" (e.g., as a high-level processing concept and specific requirement) as a keyword may waste precious time to review a search engine result containing the incorrectly described logic of an application, and ultimately discard the result, because the application fails to meet the encryption requirement. The developer must locate and examine fragments of the application logic that allegedly implements encryption before determining that the application fails to meet the requirement. The developer may spend scarce project development budget resources and significant amount of time to analyze the application before determining that the application is not relevant. The developer may even observe the runtime behavior of the application to ensure that the behavior matches the high-level processing concepts desired by the stakeholders, and meets the requirements in support of the high-level processing concepts before establishing that the logic of the application qualifies as HRAL. Current evaluation tools also lack the ability to assist developers to rapidly identify requirements in support of high-level processing concepts described by stakeholders.

Some evaluation tools return code snippets (e.g., segments of application logic), however, code snippets do not give enough background or context to assist developers to rapidly evaluate and validate the logic, and such evaluation tools require developers to invest significant intellectual effort (e.g., cognitive distance) to understand the broader scope of the code snippets. Other existing approaches and tools retrieve snippets of code based on the context of the application logic that developers work on, but while these approaches and tools improve the productivity of developers, they do not return highly relevant applications logic from high-level processing concepts as inputs.

A need has long existed for a system and method that efficiently evaluates and validates application logic to identify HRAL and deployable application.

SUMMARY

The recommended application evaluation system (RAE) provides a way to rapidly and efficiently evaluate the logic of recommended applications to validate that the recommended applications actually do implement highly relevant application logic (HRAL). One implementation of RAE includes a machine readable medium and logic stored on the machine readable medium that implements RAE area logic. The RAE area logic is operable to obtain recommended applications (e.g., highly relevant applications (HRAs)) for evaluation. The recommended applications may be supplied to the RAE in the form of source code for the recommended application, or in other forms.

The RAE area logic presents a concept query display region that displays topics, concepts and words of a query used to find the recommended applications. The RAE area logic presents a concept distribution display region that displays a recommended application representation of one of the recommended applications. The recommended application representation includes concept distribution locators that identify potential implementation locations of one of the topics, concepts and words. The RAE area logic presents a source code display region that is responsive to a selection of one of the concept distribution locators. The source code display region displays a portion of the source code that includes the potential implementation location for the selection of one of the concept distribution locators. The RAE area logic presents a metadata display region that displays metadata generated upon execution of the query.

In one implementation, the recommended applications (e.g., HRAs) are identified using the EXEcutable exaMPLes ARchive system (Exemplar). Exemplar identifies the location (e.g., concept distribution locators) in application logic where an API call implements a high-level processing concept. Using Exemplar, a developer enters high-level processing concepts (e.g., toolbar, download, smart card) as input (e.g., initial query keywords), and Exemplar uses information retrieval and program analysis techniques to retrieve HRAs that implement the high-level processing concepts in the application. Exemplar may also accept various types of inputs that describe high-level processing concepts (e.g. concept text identifiers, concept visual identifiers, concept audio identifiers, and any other sensory identifier usable to identify high-level processing concepts). Exemplar uses the help pages and help documentation of third-party libraries, software development kits, and other middleware to produce a list of names of API calls that Exemplar in turn uses to expand an initial query ("query expansion") to identify the highly relevant application logic of an application. Exemplar determines the behavior of the application logic and API call logic and ranks the API calls.

Exemplar uses help documentation or other trusted sources that describe API calls to expand queries. An application provider typically provides the help pages and help documentation for their applications, which developers consider reliable and a trusted source. In particular, developers consider application providers trusted sources for help pages and help documentation of popular and widely used applications written by large development teams, produced under rigorous testing and development best practices, and used by other developers who provide feedback regarding documentation using different forums (e.g., user groups). Developers trust help documentation over the descriptions of applications included in application repositories, because application providers generally produce more verbose and accurate help documentation than the descriptions of applications included in application repositories. Developers also trust help documentation because many different people and review procedures are typically used to produce help documentation.

Exemplar query expansion increases the probability of identifying logic matches that validate that the logic is highly relevant application logic, and addresses the vocabulary problem mentioned above by expanding an initial query to include new keywords, metadata, and semantics information found in help pages and other help documentation determined to have similar meanings to the keywords originally used by a developer in the initial query. Exemplar expands an initial query to include the names of API calls with semantics that reflect (in many cases unequivocally) specific behaviour of the application. Exemplar locates application logic containing the API calls that exhibit desired semantics by identifying API calls through help pages and help documentation. Exemplar provides a user interface that developers can use to navigate directly to the various locations to determine how an HRA implements high-level processing concepts.

Exemplar may rank HRAs according to the number of high-level processing concepts implemented by each API call found in the HRAs, or based on other ranking metrics. In other words, since API calls implement high-level processing concepts, the more high-level processing concepts implemented by an HRA the more relevant the HRA and the higher the rank assigned to the HRA. Exemplar considers keywords included in queries to represent logically connected concepts. Often a question structured as a sentence forms the basis for a query, from which a developer extracts keywords to form the query. For example, consider the query "send receive secure XML." Where a query presents a relation between multiple concepts (e.g., send secure XML), then a relation should exists between API calls that implement the concepts in the corresponding application logic (e.g., API calls that encrypt, process or handle XML formatted content, and transmit content). Application logic often preserves the relations between concepts (e.g., control flow and data flow links), an instance of the software reflection model concept and known as connectivity heuristics. Exemplar calculates HRAs rankings based on analyzing the connectivity heuristics of API calls that implement the concepts included in the queries. Exemplar uses program analysis algorithms, and computes control flow graphs (CFG), and data flow graphs (DFG) to analyze the connectivity heuristics of API calls.

RAE provides a way to rapidly and efficiently evaluate the logic of recommended applications to validate that the recommended applications implement highly relevant application logic (HRAL).

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
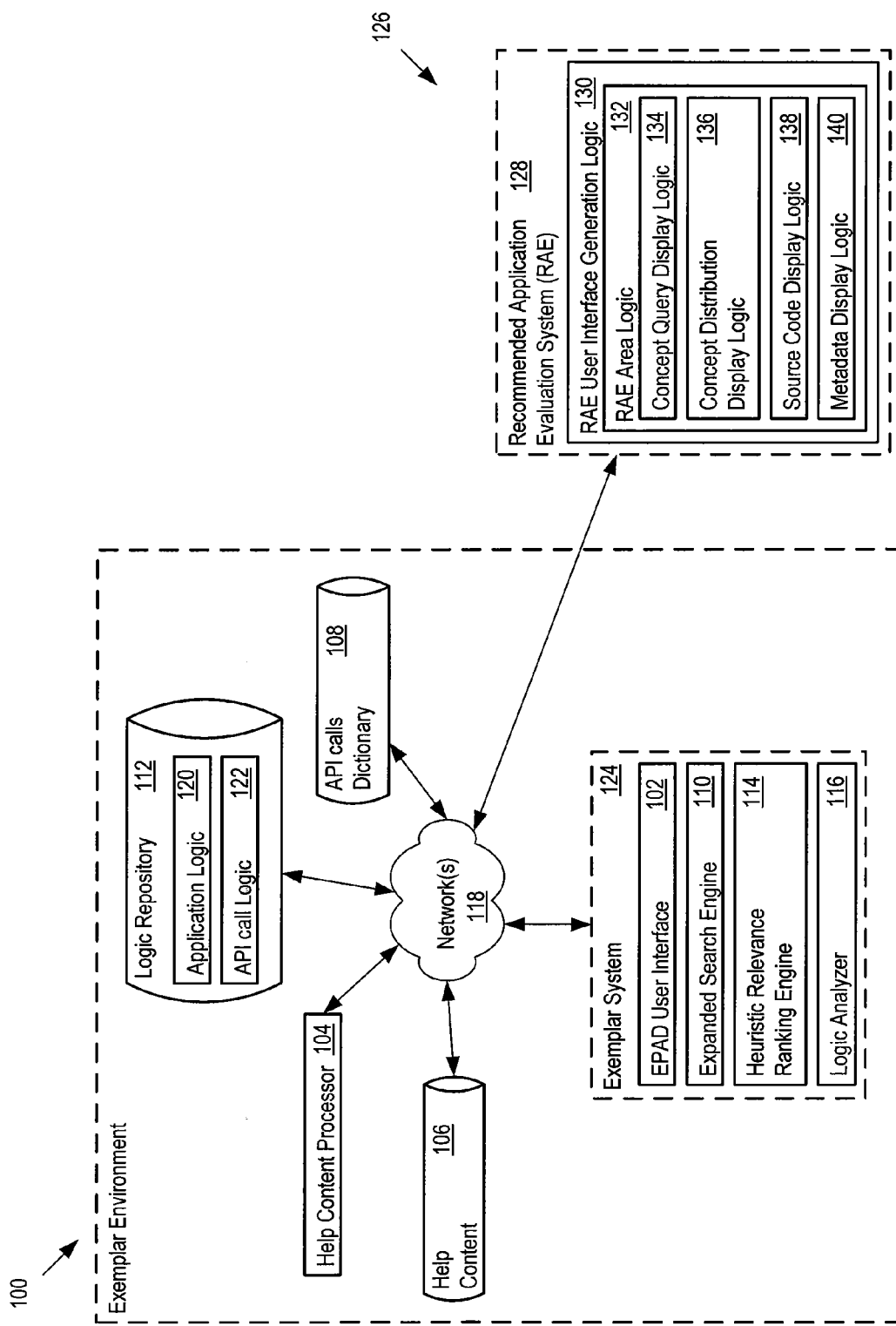
FIG. 1 illustrates the recommended application evaluation system (RAE) configuration.

The recommended application evaluation system (RAE) solves the technical problem of providing a tool to easily and quickly evaluate a recommended application to validate that the recommended application implements a particular functionality. In one implementation, the RAE may evaluate recommended applications obtained from the EXEcutable exaMPLes ARchive system (Exemplar).

Exemplar provides a tool that accepts high-level processing concepts as queries to identify, determine the behavior, rank and return the application logic of HRAs. Exemplar solves an instance of the difficult vocabulary problem that exists when users and developers describe processing concept with different words. Exemplar is not limited to basic keyword matching used in queries against application descriptions and comments included with application logic. Accordingly, when an application is highly relevant, and where a query contains keywords different from the words used by the developer to describe application logic and API call logic, Exemplar nevertheless returns the application as a highly relevant application.

Exemplar matches high-level processing concepts (e.g., expressed using keywords) with the descriptions of various API calls found in help documents or other trusted descriptive sources. Because a typical application invokes API calls from several different libraries, several different people who use different vocabularies often author help documents associated with API calls. The richness of different vocabularies increases the probability of finding matches and producing a long list of potentially relevant applications and API calls. Searching help documents or other trusted descriptive sources produces additional benefits. For example, help documents including an API call often indicate where the application logic implements the API call. Consequently, Exemplar may direct a developer to the location in application logic where an API call implements a high-level processing concept. The developer may then determine the relevance of the application logic and API call logic. In other words, the developer may determine whether the application logic and API call logic actually support the high-level processing concept.

Although specific components of Exemplar and RAE will be described, methods, systems, and articles of manufacture consistent with Exemplar and/or the RAE may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. An example of such a signal is a physical layer Ethernet signal bearing TCP/IP packets that include program source code or executable programs. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

FIG. 1 illustrates the Exemplar system environment 100 ("Exemplar environment" 100) in communication with a recommended application evaluation system (RAE) 128. The Exemplar environment 100 may include an Exemplar prototyping and application development (EPAD) user interface 102, a help content processor 104, and help content 106. The Exemplar environment 100 also includes an API calls dictionary 108, expanded search engine 110, logic repository 112, heuristic relevance ranking engine 114, and a logic analyzer 116. Any or all of the elements shown in FIG. 1 may be co-located or distributed and in communication over one or more networks 118 (e.g., the Internet).

In one implementation, the EPAD user interface 102, expanded search engine 110, heuristic relevance ranking engine 114 and logic analyzer 116 form an Exemplar system 124 within the Exemplar environment 100. The Exemplar system 124 may include additional or different components. The Exemplar system 124 may communicate with the help content processor 104, help content 106, API calls dictionary 108, and logic repository 112, as well as other systems, through the networks 118 (e.g., Internet) as external systems.

The logic repository 112 may include application logic 120 and API call logic 122. The Exemplar system 124 accepts high-level processing concepts (e.g., "send secure XML") as input and produces output identifying which application logic 120 and API call logic 122 developers may use to prototype and develop new applications implementing the high-level processing concepts. In one implementation, the Exemplar environment 100 implements the help content 106 and the logic repository 112 with multiple storage devices (e.g., multiple databases on different disk drives), and interfaces to help content 106, application logic 120 and API call logic 122 from various available source (e.g., local or remote help databases, websites, knowledge exchanges, document repositories, or other sources).

In one implementation, the help content processor 104 may be implemented as a web crawler that traverses available application repositories, and downloads help content 106 (e.g., application descriptions), and logic repository 112 content (e.g., application logic 120, and API logic 122). The help content processor 104 may also perform full text indexing on the help content 106 and the logic repository 112 content. The help content processor 104 may further produce an API calls dictionary 108 that includes sets of tuples (a form of ordered list) that link selected words from the descriptions of the API calls to the names of the API calls.

The description above used the examples of application logic 120 and API call logic 122. These types of logic may be program source code (e.g., C or C++ code), for example. However, the Exemplar environment 100 may search, analyze, and determine relevance for many other types of logic. As examples, the logic repository 112 may include programs or program components expressed in a visual programming language using graphical program elements and spatial arrangements of text and graphic symbols. The visual programming logic may include icon-based logic, form-based logic, diagram-based logic or other types of visual expression. The visual expression may be consistent with dataflow languages, flow-based programming, domain-specific modelling, or other programming paradigms.

In one implementation, the Exemplar environment 100 and the RAE 128 are present in a RAE environment 126. The RAE 128 includes a RAE user interface generation logic 130 that comprises RAE area logic 132. The RAE area logic 132 comprises concept query display logic 134, concept distribution display logic 136, source code display logic 138 and metadata display logic 140. Aspects of the RAE 128 are discussed in further detail below.

Figure 2:
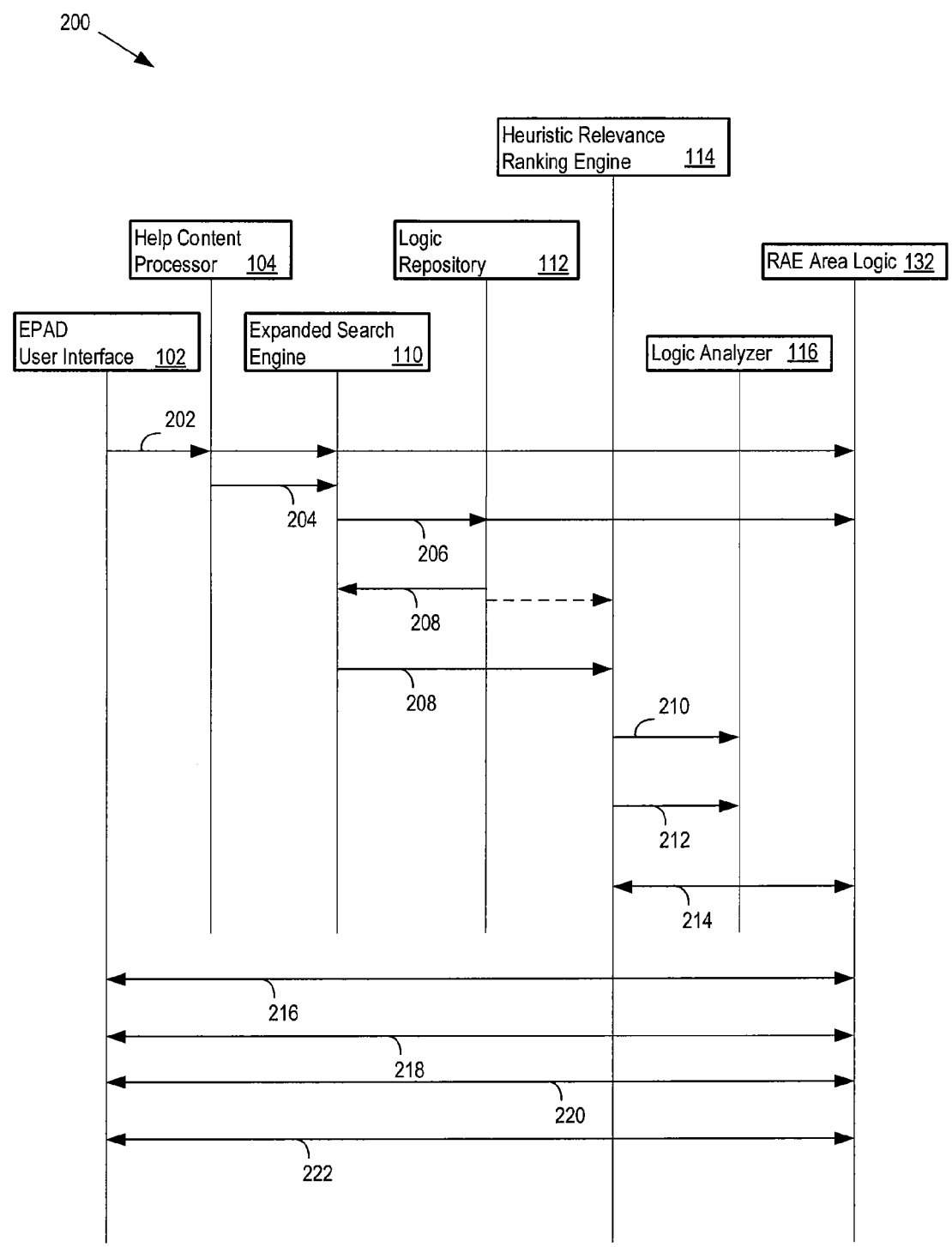
FIG. 2 shows an Exemplar data flow diagram.

FIG. 2 shows an Exemplar data flow diagram 200. Exemplar system 124 accepts a high-level processing concept as input to create an original query 202 that Exemplar system 124 may forward to the help content processor 104. The help content processor 104 may produce a basis API call list 204 from the API calls dictionary 108 by matching the words in the high-level processing concepts (e.g., "send secure XML") found in the original query 202 executed to search the help content 106.

The expanded search engine 110 may combine the original query 202 and the basis API call list 204 to form an expanded query 206. The expanded search engine 110 may execute an expanded search using the expanded query 206 to search through the logic repository 112 to obtain an expanded search result 208. In one implementation, the logic repository 112 may return the expanded search results 208 to the heuristic relevance ranking engine 114. The expanded search result 208 may contain a list of potentially relevant applications 210 and potentially relevant API calls 212 that the heuristic relevance ranking engine 114 analyzes using the logic analyzer 116. In one implementation, the heuristic relevance ranking engine 114 may include the logic analyzer 116. The logic analyzer 116 may include a parser generator such as ANTLR ("ANother Tool for Language Recognition") available from www.antlr.org that provides support for generating data flow graphs and control flow graphs.

The logic analyzer 116 may return connectivity rankings 214, discussed in detail below, to further determine an application heuristic relevance ranking 216 and an API call heuristic relevance ranking 218. The heuristic relevance ranking engine 114 may return the application heuristic relevance ranking 216 and an API call heuristic relevance ranking 218 to the EPAD user interface 102. The expanded search engine 110 may also return a relevant applications list 220 and a relevant API calls list 222 to the EPAD user interface 102. The Exemplar system 124 may assign an application heuristic relevance ranking 216 to one or more relevant applications found in the relevant applications list 220 to indicate how closely each relevant application supports the high-level processing concept represented by the original query 202. Similarly, Exemplar system 124 may assign an API call heuristic relevance ranking 218 to one or more relevant API calls found in the relevant API call list 222 to indicate how closely each relevant API call supports the high-level processing concept represented by the original query 202.

In one implementation, the RAE area logic 132 obtains the connectivity rankings 214, the application heuristic relevance rankings 216, the API call heuristic relevance rankings 218, the relevant applications list 220, and the relevant API call list 222. The RAE area logic 132 may use the connectivity rankings 214, the application heuristic relevance rankings 216, the API call heuristic relevance rankings 218, the relevant applications list 220, and the relevant API call list 222 to present a recommended application evaluation area, discussed in detail below, to evaluate recommended applications obtained from Exemplar 124.

Figure 3:
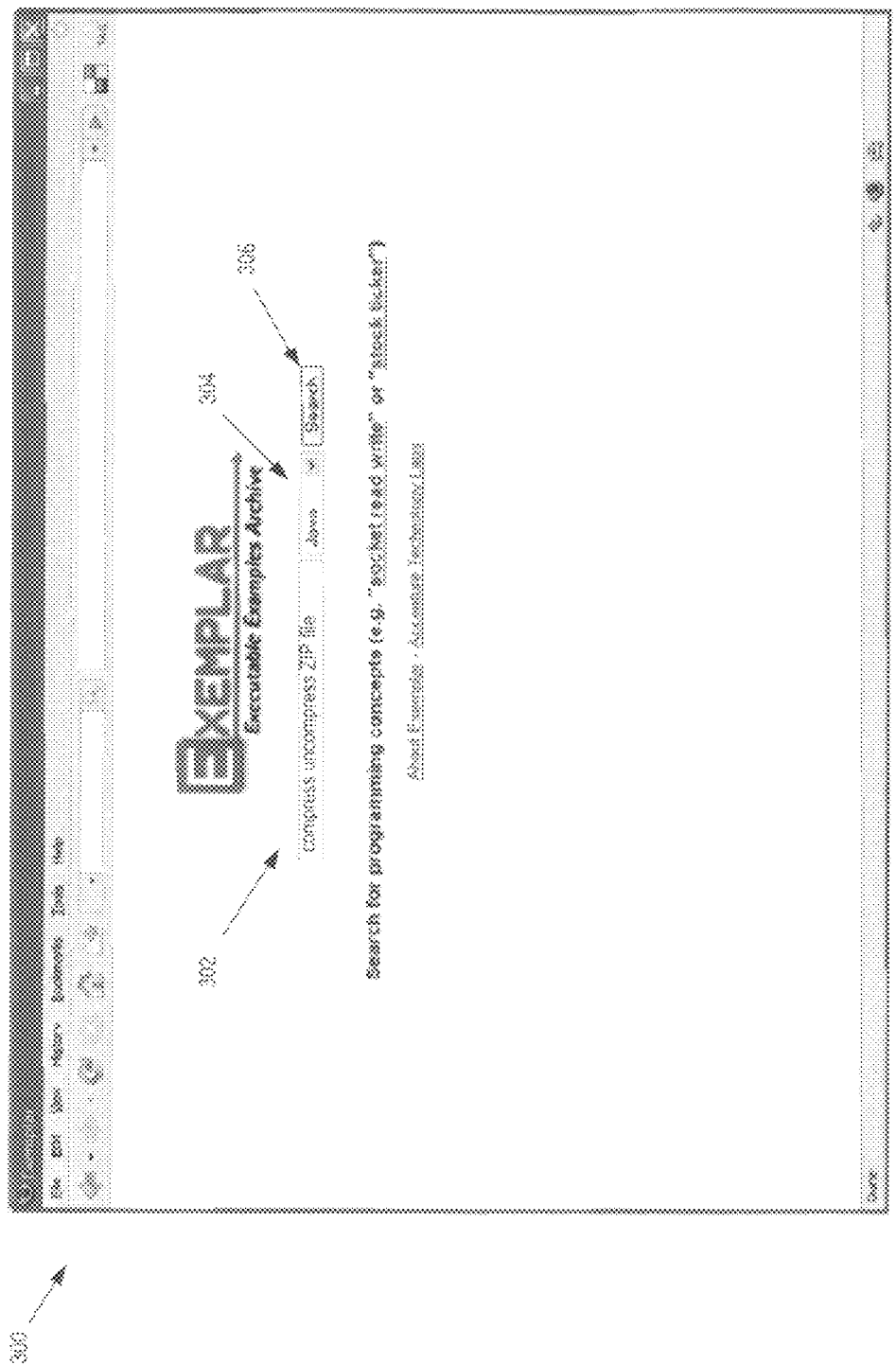
FIG. 3 illustrates an Exemplar query interface that may be used to input an original query.

FIG. 3 illustrates an Exemplar query interface 300 that may be used to input an original query 202. The original query 202 may represent a high-level processing concept such as "compress uncompress ZIP file," as shown in the text entry field 302. Several developers may have implemented the example high-level processing concept "compress uncompress ZIP file" 302 in different ways with various API calls described in the help content 106, API calls dictionary 108 and logic repository 112. A user may specify search refinement criteria 304 using interface elements such as a drop down box, menu or user input field. The search refinement criteria 304 may dictate the types of logic of interest (e.g., C, C++, JAVA, or other types of logic), may dictate the information sources searched (e.g., search only compiled Help files, or *.doc files), or may specify other search criteria. The Exemplar query interface 300 may include graphical user interface elements (e.g., the search button 306) used to execute the original query 202.

Table 1 shows an example of an original query 202 in the form of a structured query language statement (SQL) that represents the high-level processing concept "compress uncompress ZIP file" 302. Table 1 shows that the original query 202 will search the help content 106 (e.g., Java Help Documents) to identify a basis API calls list 204.

TABLE 1 original query 202

SELECT basis API Calls
   FROM Java Help Documents
      WHERE Words in these Documents =
         compress or uncompress or ZIP or file.

Table 2 shows one example of the help content 106 represented by a fragment of Java Help Documentation released by Sun Microsystems, Inc. that describes the functionality of classes exported from the Java.util package. The Java.util package defines a number of classes, primarily collections classes that a developer may use when working with groups of objects. Referring to Table 2, the help content processor 104 may identify partial matches for the class ZipEntry to the original query 202. The help content processor 104 may search the help content 106 and identify a fragment of the help documentation for the ZipEntry class shown in Table 3.

TABLE 2 help content 106 (e.g. a fragment of Java Help Document)

| Class | Summary |
|---|---|
| Adler32 | A class that can be used to compute the Adler-32 checksum of a data stream. |
| CheckedInputStream | An input stream that also maintains a checksum of the data being read. |
| CheckedOutputStream | An output stream that also maintains a checksum of the data being written. |
| CRC32 | A class that can be used to compute the CRC-32 of a data stream. |
| Deflater | This class provides support for general purpose compression using the popular ZLIB compression library. |
| DeflaterInputStream | Implements an input stream filter for compressing data in the "deflate" compression format. |
| DeflaterOutputStream | This class implements an output stream filter for compressing data in the "deflate" compression format. |
| GZIPInputStream | This class implements a stream filter for reading compressed data in the GZIP file format. |
| GZIPOutputStream | This class implements a stream filter for writing compressed data in the GZIP file format. |
| Inflater | This class provides support for general purpose decompression using the popular ZLIB compression library. |
| InflaterInputStream | This class implements a stream filter for uncompressing data in the "deflate" compression format. |
| InflaterOutputStream | Implements an output stream filter for uncompressing data stored in the "deflate" compression format. |
| ZipEntry | This class is used to represent a ZIP file entry. |
| ZipFile | This class is used to read entries from a zip file. |
| ZipInputStream | This class implements an input stream filter for reading files in the ZIP file format. |
| ZipOutputStream | This class implements an output stream filter for writing files in the ZIP file format. |

Table 3 shows the descriptions of two different methods (e.g., getCompressedSize, and setMethod) for the ZipEntry class that include the terms compress and uncompress found in the high-level processing concept "compress uncompress ZIP file" 302. The basis API call list 204 may include the getCompressedSize and setMethod methods.

TABLE 3 help content 106 (e.g., fragment of help documentation for ZipEntry class)

| Method | Summary |
|---|---|
| Object | clone( ) |
| | Returns a copy of this entry. |
| String | getComment( ) |
| | Returns the comment string for the entry, or null if none. |
| long | getCompressedSize( ) |
| | Returns the size of the compressed entry data, or −1 if not known. |
| long | getCrc( ) |
| | Returns the CRC-32 checksum of the uncompressed entry data, or −1 if not known. |
| byte[ ] | getExtra( ) |
| | Returns the extra field data for the entry, or null if none. |
| int | getMethod( ) |
| | Returns the compression method of the entry, or −1 if not specified. |
| String | getName( ) |
| | Returns the name of the entry. |
| long | getSize( ) |
| | Returns the uncompressed size of the entry data, or −1 if not known. |
| long | getTime( ) |
| | Returns the modification time of the entry, or −1 if not specified. |
| int | hashCode( ) |
| | Returns the hash code value for this entry. |
| boolean | isDirectory( ) |
| | Returns true if this is a directory entry. |
| void | setComment(String comment) |
| | Sets the optional comment string for the entry. |
| void | setCompressedSize(long csize) |
| | Sets the size of the compressed entry data. |
| void | setCrc(long crc) |
| | Sets the CRC-32 checksum of the uncompressed entry data. |
| void | setExtra(byte[ ] extra) |
| | Sets the optional extra field data for the entry. |
| void | setMethod(int method) |
| | Sets the compression method for the entry. |
| void | setSize(long size) |
| | Sets the uncompressed size of the entry data. |
| void | setTime(long time) |
| | Sets the modification time of the entry. |
| String | toString( ) |
| | Returns a string representation of the ZIP entry. |

Table 4 shows an example of two equivalent forms of an expanded query 206 that expand the original search from the help content 106 (e.g., Java Help Documents) to the logic repository 112 using the basis API call list 204 from the original query 202. Table 4 statement A shows the getCompressedSize and setMethod that may be included in the basis API call list 204. Table 4 statement B shows the expanded query 206 as a nested query, where the original query 202 and the basis API call list 204 (e.g., getCompressedSize and setMethod) drive the outer query that searches the logic repository 112 for potentially relevant applications 210 to obtain the expanded query result 208 including potentially relevant applications 210 and potentially relevant API calls 212. The expanded query 206 may improve upon the original query 202 by targeting the search performed against the logic repository 112 to obtain application logic 120 with a high probability of including potentially relevant applications 210 and potentially relevant API calls 212.

TABLE 4 expanded query 206

A.  SELECT Potentially Relevant Applications
    FROM Logic Repository
    WHERE API Calls in
        Source Code Files of these Application
            = getCompressedSize or setMethod.
/********** The SQL statement above also expressed below. **************/
B.  SELECT Potentially Relevant Applications
    FROM Logic Repository
    WHERE API Calls in
        Source Code Files of these Application
            = {
                SELECT basis API Calls
                FROM Java Help Documents
                WHERE Words in these Documents =
                    compress or uncompress or ZIP or file
            }.

Table 5 shows another example of two equivalent forms of an expanded query 206 that expand the original search from the help content 106 (e.g., Java Help Documents) to the logic repository 112 by combining the original query 202 and the basis API call list 204 to form the expanded query 206. Table 5 statement A shows the getCompressedSize and setMethod (e.g., the basis API call list 204) combined with the original query 202. Table 5 statement B shows the expanded query 206 as a nested query, where the original query 202 and the basis API call list 204 (e.g., getCompressedSize and setMethod) drive the outer query that searches the logic repository 112 for potentially relevant applications 210 to obtain the expanded query result 208 including potentially relevant applications 210 and potentially relevant API calls 212. The expanded query 206 may improve upon the original query 202 by targeting the search performed against the logic repository 112 to obtain application logic 120 with a high probability of including potentially relevant applications 210 and potentially relevant API calls 212.

TABLE 5 expanded query 206

A.  SELECT Potentially Relevant Applications
    FROM Logic Repository
    WHERE API Calls in
        Source Code Files of these Application
            = getCompressedSize or setMethod or
              compress or uncompress or ZIP or file.
/********** The SQL statement above also expressed below. **************/
B.  SELECT Potentially Relevant Applications
    FROM Logic Repository
    WHERE API Calls in
        Source Code Files of these Application
            = {
                SELECT basis API Calls
                FROM Java Help Documents
                WHERE Words in these Documents =
                    compress or uncompress or ZIP or file
              } or compress or uncompress or ZIP or file.

Table 6 shows an example of a fragment of logic extracted from the logic repository 112 (e.g., potentially relevant application 210) that includes a potentially relevant API call 212 (e.g., getCompressedSize).

TABLE 6 potentially relevant application 210
(e.g., extracted logic fragment)

```
public static void addFilesToExistingZip(File zipFile, File[ ] files)
        throws IOException {
    // get a temp file
            File tempFile = File.createTempFile(zipFile.getName( ),
                null);
    // delete it, otherwise you cannot rename your existing zip to it.
            tempFile.delete( );
            int sz = zipFile.getCompressedSize( ):
            boolean renameOk=zipFile.renameTo(tempFile);
            if (!renameOk && sz == −1)
            {
                throw new RuntimeException("could not rename the
file"+zipFile.getAbsolutePath( )+" to "+tempFile.getAbsolutePath( ));
            }
            byte[ ] buf = new byte[1024];
```

Figure 4:
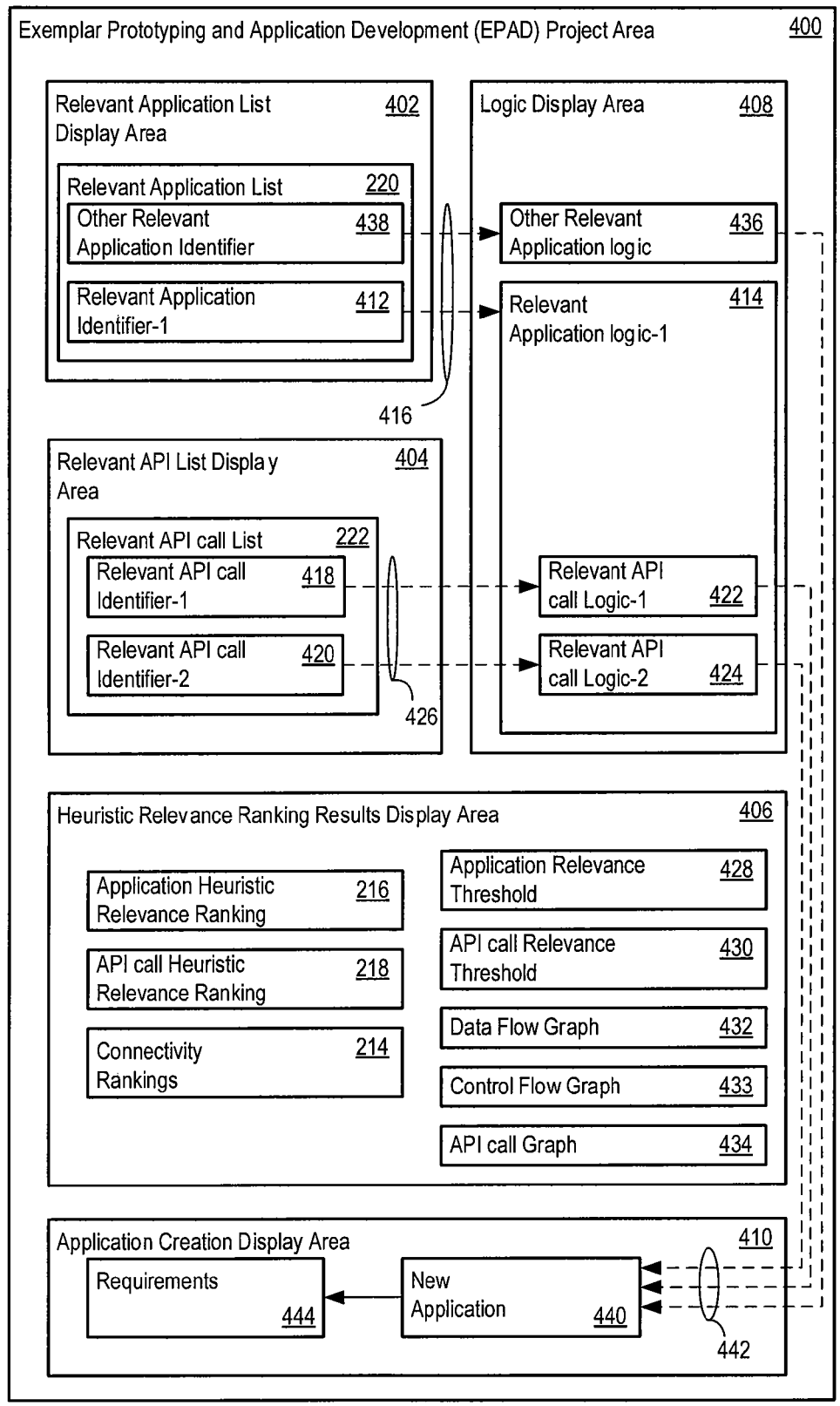
FIG. 4 shows an Exemplar system prototyping and application development (EPAD) project area.

FIG. 4 shows an Exemplar system 124 prototyping and application development (EPAD) project area 400. The EPAD project area 400 may include a relevant application list display area 402, relevant API list display area 404, heuristic relevance ranking results display area 406, logic display area 408, and application creation display area 410. The relevant application list display area 402 may include the relevant application list 220 produced by the Exemplar system 124 based on the expanded query 206 search results. The relevant applications list 220 may include a relevant application identifier-1 412 (e.g., a program name, repository identifier, file name, or other program specifier) of relevant application logic 414. A user may select any identifier, as indicated by the arrow 416, to display the relevant application logic 414 (e.g., source code for the program) in the logic display area 408. The EPAD user interface 102 may include a keyboard, mouse, a microphone (or other sensors), joystick, game pad, or the like for the user to interact with the EPAD project area 400.

The relevant API list display area 404 may include the relevant API call list 222 returned by Exemplar system 124 based on the original query 202. The relevant API call list 222 may include a relevant API call identifier-1 418 (e.g., a function call name) and a relevant API call identifier-2 420 of the relevant API call logic-1 422 (e.g., source code for the function call) and relevant API call logic-2 424, respectively. The EPAD project area 400 may present the relevant API call identifier-1 418 and the relevant API call identifier-2 420 as user selectable, indicated by the arrow 426, to display and highlight the relevant API call logic-1 422 and the relevant API call logic-2 424 in the logic display area 408. In one implementation, the logic display area 408 may highlight the relevant application logic 414, and relevant API call logic-1 422 and relevant API call logic-2 424 so that the user can further determine the relevance of the logic to the high-level processing concept represented in the original query 202.

The heuristic relevance ranking results display area 406, shown in FIG. 4, may include an application relevance threshold 428, an API call relevance threshold 430, data flow graph 432, control flow graph 433, and an API call graph 434. The heuristic relevance ranking results display area 406 may display heuristic relevance ranking engine 114 information to assist the user to determine the relevance of user selected logic. As will be described in more detail below, the heuristic relevance ranking engine 114 may determine the application heuristic relevance ranking 216 for the relevant application logic 414 based on the number of relevant API calls (e.g., relevant API call logic-1 422 and relevant API call logic-2 424) found in the relevant application logic 414 in comparison to other relevant application logic 436 identified by Exemplar system 124. For example, the high-level processing concept example "compress uncompress ZIP file" 302 may be entirely implemented in relevant application logic 414, but only partially implemented in the other relevant application logic 436. As a result, the heuristic relevance ranking engine 114 may assign the relevant application logic 414 a higher application heuristic relevance ranking 216 than the other relevant application logic 436. In another implementation, the heuristic relevance ranking engine 114 may determine the API call heuristic relevance rankings 218 of the relevant API call logic-1 422 and the relevant API call logic-2 424, based on analyzing semantics derived from the expanded query 206 and the expanded search result 208, which establish the behaviour of the relevant API call logic-1 422, the relevant API call logic-2 424, and the relevant applications logic-1 414.

The application relevance threshold 428 and API call relevance threshold 430, shown in FIG. 4, may be user selectable and/or pre-configured with system default values. In another implementation, Exemplar system 124 may determine the application relevance threshold 428 and the relevance threshold 430 based a number of factors (e.g., the complexity of the high-level processing concept represented by the original query 202, and the number of potentially relevant applications 210 and potentially relevant API calls 212 identified by the expanded search result 208). Exemplar system 124 may use the application relevance threshold 428 and the relevance threshold 430 to further refine the relevant applications list 220 and the relevant API calls list 222, respectively. In one implementation, the application relevance threshold 428 and the relevance threshold 428 may determine an application heuristic relevance ranking 216 value that the potentially relevant applications 210 must meet to be included on the relevant applications list 220. The API call relevance threshold 430 may also determine the API call heuristic relevance ranking 218 value that the potentially relevant API calls 212 must meet to be included on the relevant API calls list 222. For example, an application relevance threshold 428 of 1 may indicate a low relevance requirement (e.g., requiring loosely relevant applications, and low application heuristic relevance rankings 216) and allow a large number of potentially relevant applications 210 to qualify as relevant applications (e.g., relevant application logic-1 414). In another example, an application relevance threshold 428 of 10 may indicate a high relevance requirement (e.g., requiring highly relevant applications, and high application heuristic relevance rankings 216) and allow only a fewer number of potentially relevant applications 210 to qualify as relevant applications. The heuristic relevance ranking engine 114 may also use the data flow graph 432 and control flow graph 433 to determine the application heuristic relevance ranking 216 and API call heuristic relevance ranking 218, and visually describe the relationships between the relevant application logic 414, the relevant API call logic-1 422, and the relevant API call logic-2 424, discussed in further detail below.

The relevant API call logic-1 422 and the relevant API call logic-2 424 may be user selectable (indicated by the arrow 442), and provide the user the ability to generate a new application 440 with the selected logic. To that end, the EPAD project area 400 may implement point-and-click, drag-and-drop functionality for a user to select relevant API call logic-1 422 and relevant API call logic-2 424 to generate the new application 440. The EPAD project area 400 may also build the new application 440 by combining user selectable other relevant application logic 436, relevant API call logic-1, and relevant API call logic-2. The application creation display area 410 may also identify requirements 444 for the high-level processing concept represented by the original query 202. For example, a developer may desire to identify and confirm the requirements 444 for implementing a high-level processing concept (e.g., "send secure XML"). In one implementation, Exemplar may generate requirements documentation and end user documentation based on the help content 106 related to the other relevant application logic 436, the relevant API call logic-1, and the relevant API call logic-2 used to build the new application 440, and identify the requirements 444 in support of the new application 440.

Figure 5:
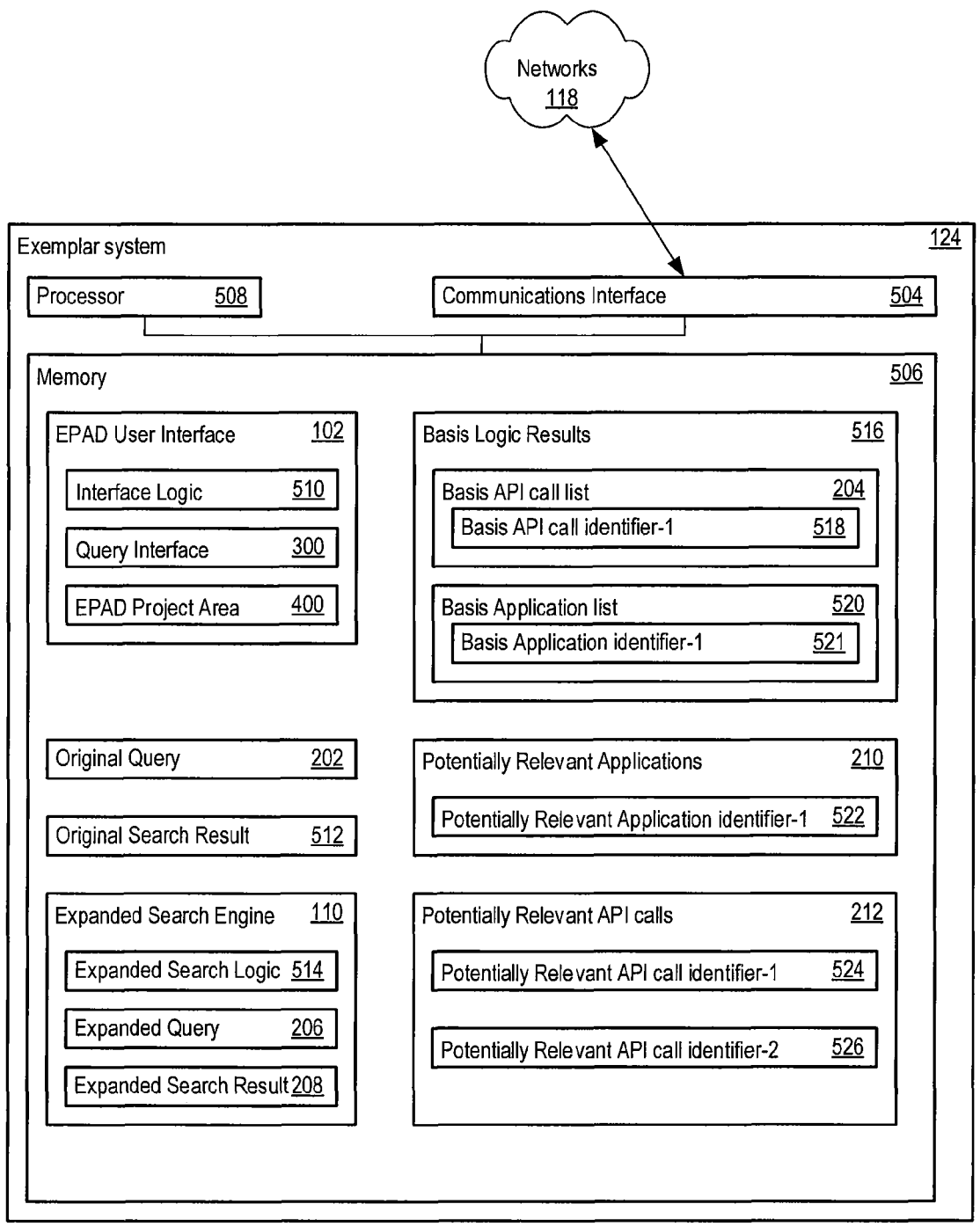
FIG. 5 shows a more detailed view of the Exemplar system.

FIG. 5 shows a more detailed view of the Exemplar system 124. The Exemplar system 124 may include a communications interface 504 used to communicate with various resources internal and external to Exemplar system 124, memory 506, and a processor 508. The processor 508 may execute any of the logic described below. The memory 506 may include the EPAD user interface 102 that employs the interface logic 510 to generate the Exemplar query interface 300, and the EPAD project area 400. The interface logic 510 may include graphics libraries, window rendering calls, and other user interface logic operable to display interface elements, receive input, and pass the input to any particular program logic in the Exemplar system 124.

The memory 506 may also include expanded search logic 514. Table 5, above, shows an expanded query 206 where the search logic 514 forms the expanded query by combining the original query 202 and the basis API call list 204 to form the expanded query 206. More generally, the expanded search logic 514 combines the original query 202 and the basis logic results 516 to form the expanded query 206, and executes an expanded search using the expanded query 206. The basis logic results 516 may include the basis API call list 204, including zero or more basis API call identifiers (e.g., the basis API call identifier-1 518), and a basis application list 520, including zero or more basis application identifiers (e.g., the basis application identifier-1 521). The expanded search logic 514 thereby obtains the expanded search results 208. The expanded search result 208 may include potentially relevant applications 210, and potentially relevant API calls 212 that include zero or more potentially relevant application identifiers-1 522 and zero or more potentially relevant API call identifiers (e.g., potentially relevant API call identifier-1 524 and potentially relevant API call identifier-2 526).

Figure 6:
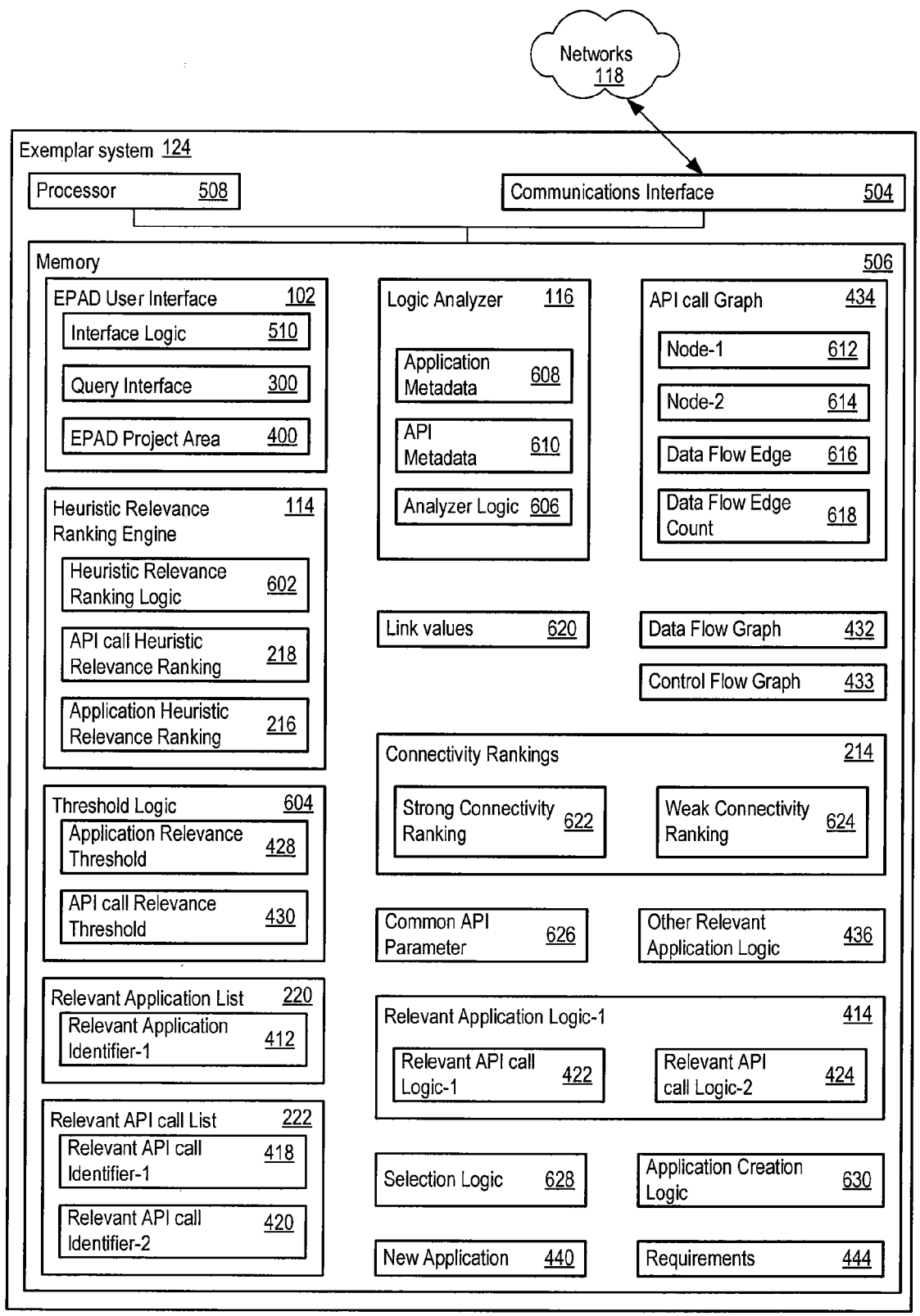
FIG. 6 shows other features of the Exemplar system.

FIG. 6 shows other features of the Exemplar system 124. The memory 506 may also include the heuristic relevance ranking engine 114 with the heuristic relevance ranking logic 602 that generates the application heuristic relevance ranking 216 and API call heuristic relevance ranking 218. The threshold logic 604 may apply the application relevance threshold 428 and API call relevance threshold 430 to the application heuristic relevance rankings 216 and API call heuristic relevance rankings 218 to determine whether potentially relevant applications 210 and potentially relevant API calls 212 qualify for inclusion in the relevant applications list 220 and the relevant API calls list 222. In other words, the threshold logic 604 may implement comparison logic to determine when potentially relevant logic qualifies as relevant logic.

The memory 506 may also include analyzer logic 606 that the processor 508 executes to identify application metadata 608 and API metadata 610 of the potentially relevant applications 210, and the potentially relevant API calls 212, respectively. Examples of application metadata 608 include application descriptions, application logic comments, application parameter names, and application parameter types of existing applications. Similarly, examples of API metadata 610 include API descriptions, API logic comments, API parameter names, and API parameter types.

Figure 7:
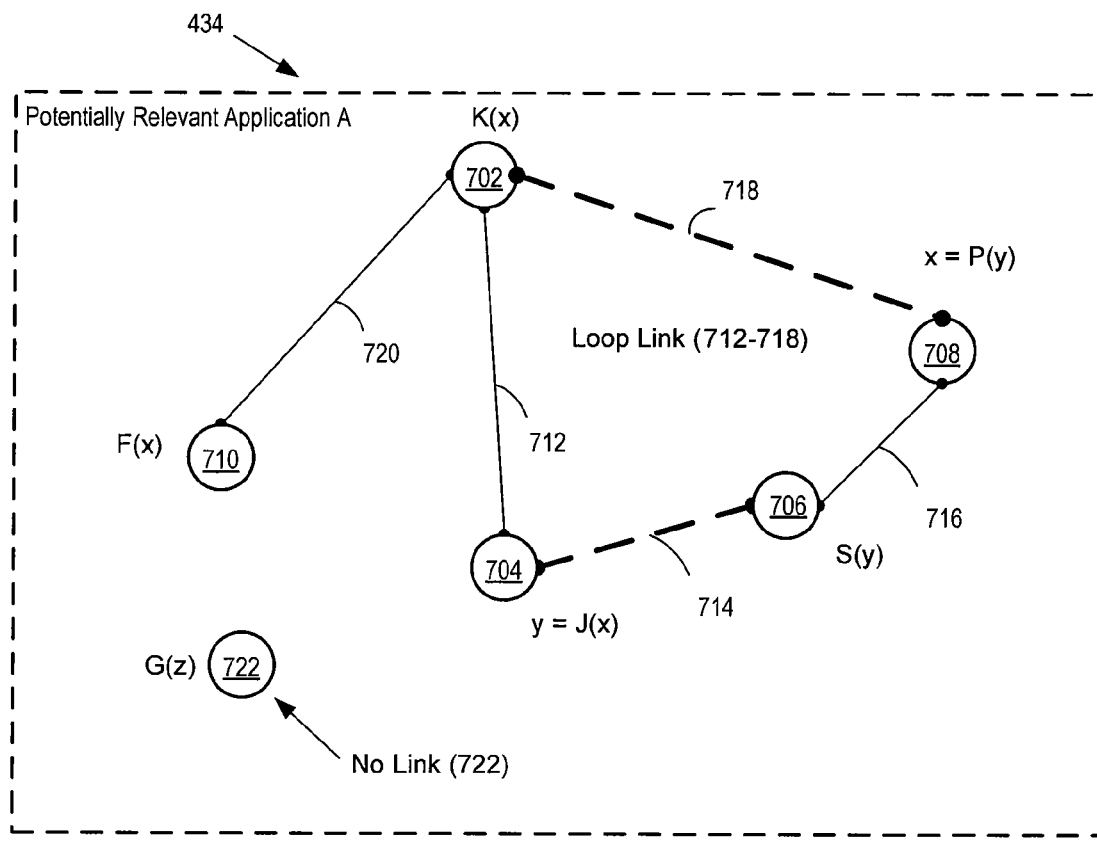
FIG. 7 shows API graphs for two different potentially relevant applications.
Figure 7:
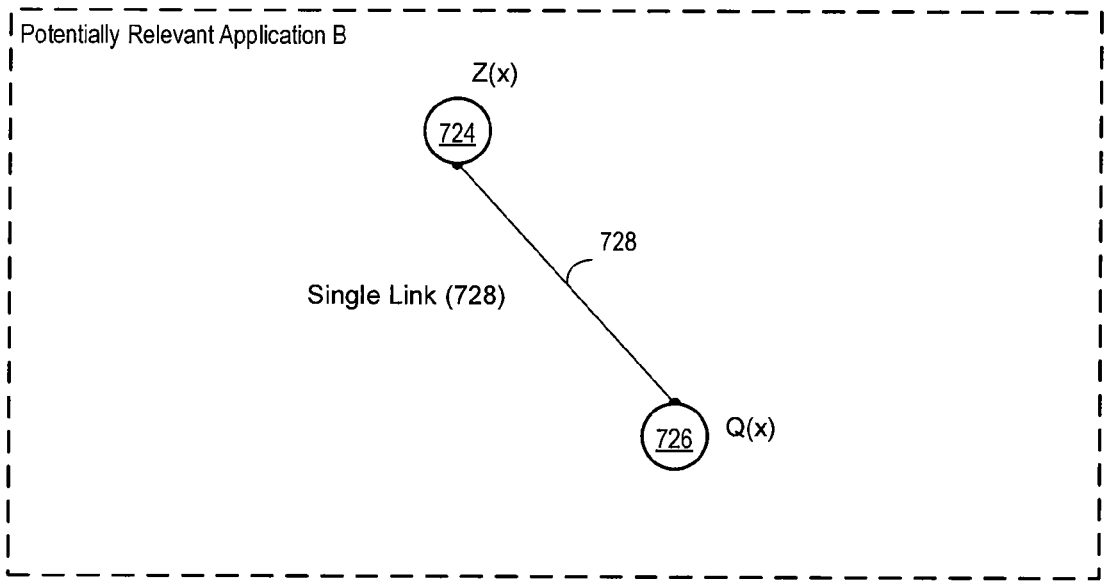

The analyzer logic 606 may generate the data flow graph 432 and control flow graph 433 to obtain the API call graph 434. The API call graph 434 may include nodes (e.g., node-1 612 and node-2 614) that represent potentially relevant API calls 212 and data flow edges (e.g., data flow edge 616) between the potentially relevant API calls 212 to indicate data flow. FIG. 7 provides additional examples. The analyzer logic 606 may determine the data flow edge count 618 corresponding to the number of connections between potentially relevant API calls 212 within the potentially relevant application 210. A graph with 'n' nodes has as many as n(n−1) edges between nodes. The data flow edge count 618 provides insight into the degree of connectedness for the data flow graph 432. The analyzer logic 606 may also assign link values 620 to the edges between nodes, discussed in detail below. In one implementation, the analyzer logic 606 may determine the connectivity rankings 214 (e.g., strong connectivity ranking 622 and weak connectivity ranking 624) for each connection between the potentially relevant API calls 212 based on common API parameters 626, discussed in detail below.

FIG. 6 further illustrates that memory 506 may include selection logic 628 and application creation logic 630. The processor 508 may execute the selection logic 628 to allow a user to select relevant application logic 414, and relevant API call logic (e.g., the relevant API call logic-1 422 and the relevant API call logic-2 424) to develop the new application 440. In another implementation, selection logic 628 may provide a user drag-and-drop point-and-click functionality to select other relevant application logic 436 to combine with the relevant API call logic-1 422, and the relevant API call logic-2 424 to build the new application 440. The processor 508 may execute the application creation logic 630 to identify requirements 444 for the high-level processing concept represented by the original query 202 by identifying the help content 106 used to obtain the basis logic results 516 corresponding to the user selected other relevant application logic 436, relevant application logic 414, relevant API call logic-1 422, and relevant API call logic-2 424. In one implementation, the application creation logic may form a query using the other relevant application logic 436, relevant application logic 414, relevant API call logic-1 422, and relevant API call logic-2 424 to obtain the help content 106 that describes the requirements 444. The application creation logic 630 may generate customized requirements documents from the help content 106 corresponding to the user selected other relevant application logic 436, relevant application logic 414, relevant API call logic-1 422, and relevant API call logic-2 424.

FIG. 7 shows API call graphs 434 for two different potentially relevant applications (e.g., a potentially relevant application A and potentially relevant application B). The heuristic relevance ranking engine 114 may assign a higher heuristic relevance ranking 216 to the potentially relevant application A than the potentially relevant application B based on the number of potentially relevant API calls 212, the connectivity rankings 214 and link values 620 assigned to each connection between potentially relevant API calls 212 included in the potentially relevant application A and potentially relevant application B, respectively.

In one implementation, the logic analyzer 116 produces the API call graphs 434. The logic analyzer 116 may identify the application metadata 608 and API metadata 610 of the potentially relevant applications 210, and the potentially relevant API calls 212, respectively, to analyze the data flow paths and connectivity between the potentially relevant API calls 212. The logic analyzer 116 may provide the application metadata 608 and API metadata 610 to the heuristic relevance ranking engine 114. In an alternative implementation, the heuristic relevance ranking engine 114 may identify application metadata 608 and API metadata 610, and produce the data flow graph 432 and control flow graph 433 using logic analysis formulas, rules and equations to obtain the API call graphs 434. The data flow graphs 432, control flow graphs 433 and API call graphs 434 may be represented as mathematical structures. The logic analyzer 116 may obtain the API call graphs 434 as a result of comparing data flow and control flow between potentially relevant API calls 212.

In one implementation, the logic analyzer 116 may perform control flow analysis on the potentially relevant application 210 to obtain control flow graphs 433, and perform data flow analysis on the control flow graphs 433 to obtain data flow graphs. The data flow graphs 432, control flow graphs 433, and API call graphs may similarly include nodes and edges. The logic analyzer 116 may obtain a control flow graph 433 by logically partitioning a potentially relevant application 210 as a result of parsing the logic of the potentially relevant application 210 into nodes that represent logic that includes API calls. The logic analyzer 116 may assign parsed logic of the potentially relevant application 210 to an assigned node until the logic analyzer 116 identifies a potentially relevant API call or branching logic (e.g., if-then, switch-case, and do-while), and add the assigned node to the control flow graph 433. Where a program includes multiple potentially relevant applications 210, the logic analyzer 116 may merge the control flow graphs 433 produced for each potentially relevant application into a single control flow graph 433. The logic analyzer 116 may obtain the API call graph 434 by comparing the edges in the control flow graphs 433 with the edges in the data flow graph 432. For example, where a control flow graph 433 includes an edge that a data flow graph 432 does not include, the logic analyzer 116 may not include the edge in the corresponding API call graph 434. However, where a control flow graph 433 includes an edge that the data flow graph 432 also includes, the logic analyzer 116 may include the edge in the API call graph 434.

In one implementation, the logic analyzer 116 may receive user input to determine particular dependencies between API calls. For example, where a potentially relevant application 210 uses a function pointer (e.g., a type of pointer used in C, and C++ languages) to reference a potentially relevant API call 212 and a hash table (e.g., a data structure that associates keys with values) to store an object that represents a data element passed between API calls, the logic analyzer 116 may receive user input to determine dependencies between API calls because the logic analyzer 116 may otherwise interpret multiple possible dependencies between API calls when in fact only one or a finite set of valid dependencies exists.

In another implementation, the logic analyzer 116 may analyze the data flow paths (e.g., edges between nodes discussed below) (e.g., link heuristics) of the potentially relevant applications 210, and potentially relevant API call logic 212 to determine the connectivity rankings 214 of each connection between potentially relevant API calls 212. In one implementation, the heuristic relevance ranking engine 114 may determine the application heuristic relevance ranking 216 for the potentially relevant application 210, shown in FIG. 7 as potentially relevant application A, based on the total number of API calls 'n' represented by nodes 712-720 that represent different potentially relevant API calls 212 found in the potentially relevant application 210, the total number of connections between the potentially relevant API calls 212 (e.g., edges 712-720) equal to n(n−1) (e.g., data flow edge count 614), the quality of the connections (e.g., strong connectivity or weak connectivity), and the type of link (e.g., loop link, single link, or no link) between the potentially relevant API calls 212.

The applications metadata 608 and API metadata 610 may describe the data flow paths between the different potentially relevant API calls 212 (e.g., nodes 702-710) within the potentially relevant application 210. For example, the logic analyzer 116 may determine common API parameters 626 and logic branches (e.g., if-then-else) found within the potentially relevant application 210 and potentially relevant API calls 212 to generate the data flow graphs 432, control flow graphs 433 and API call graphs 434. The logic analyzer 116 may, as FIG. 7 also illustrates, identify the function (e.g., K(x), J(x), S(y), P(y), F(x), and G(z)) of each potentially relevant API call 212 (e.g., 702-710, and 722) to determine the connectivity rankings 214.

In one implementation, the logic analyzer 116 may assign a weight $W_i$ (e.g., connectivity ranking 214) to each connection between the potentially relevant API calls 212 (e.g., nodes 712-720). The logic analyzer 116 may assign weak connections a weight of 0.5 and strong connections a weight of 1.0 depending on multiple factors. For example, edge 712,
edge 716 and edge 720 may represent weak connections between potentially relevant API calls 212 represented by node pairs 702 and 710, 702 and 704, and 706 and 708 (e.g., function pairs K(x) and F(x), K(x) and J(x), and S(y) and P(y), respectively). Following the above example, where functions K(x) and F(x) share a common API parameter 626, but neither function generates the value of the common API parameter 626 then the logic analyzer 116 may assign the connectivity ranking 214 between node pair 702 and 710, represented by edge 720, a weak connection weight of 0.5. A weak connection assigned to a node pair (e.g., 702 and 710) may indicate a low relative probability (e.g., in comparison to the connectivity rankings of other node pairs) that the node pair implements the high-level processing concept represented by the original query 202. The logic analyzer 116 may use other heuristic analysis methods and tools to determine whether to assign a weak connection to a connectivity ranking 214.

Alternatively, edge 714, and edge 718 may represent strong connections between potentially relevant API calls 212, represented by node pairs 702 and 708, and 704 and 706 (e.g., function pairs K(x) and P(y), and J(x) and S(y), respectively). The logic analyzer 116 may determine that where function J(x) produces variable y, which both J(x) and S(y) share then the node pair 704 and 706, represented by edge 714, may be assigned a strong connectivity ranking 622. A strong connection assigned to a node pair (e.g., 704 and 706) may indicate a high relative probability (e.g., in comparison to the connectivity rankings of other node pairs) that the node pair implements the high-level processing concept represented by the original query 202. The logic analyzer 116 may use other heuristic analysis methods and tools to determine whether to assign a strong connection to a connectivity ranking 214.

The logic analyzer 116 may also assign a link value L (e.g. link value 620) to each connection between potentially relevant API calls 212. For example, Exemplar system 124 may assign a link value L equal to 1 where a loop link (e.g., edges 712-718 form a loop) exists between potentially relevant API calls 212 (e.g., nodes 702-708). Exemplar system 124 may assign a link value L equal to 0.5 where a single link (e.g., edge 720) exists between potentially relevant API calls 212 (e.g., nodes 702-708). In another implementation, Exemplar system 124 may assign a link value L equal to 0 where no link exists between potentially relevant API calls 212 (e.g., node 722 represents a potentially relevant API call 212 that does not have a connection with other potentially relevant API calls in a potentially relevant application 210). Additional, different, or fewer weights may be used. The heuristic relevance ranking engine 114 may use the connectivity rankings 214 and link values 620 assigned to each connection between potentially relevant API calls 212 to determine the application heuristic relevance ranking 216 according to:

$$\sum_{i=1}^{n(n-1)} \frac{W_i L_i}{n(n-1)} \text{ where } i \text{ ranges from 1 to } n(n\text{-}1).\quad\text{(Equation 1)}$$

The logic analyzer 116 may determine an API call heuristic relevance ranking 218 for a potentially relevant API call 212 based on the connectivity ranking 214 and link value 620 assigned to each edge that includes the potentially relevant API call 212. For example, where m represents the number of node pair including a particular node (e.g., 702 and 704, 702 and 708, and 702 and 710) and the number of edges (e.g., 712, 718 and 720) that include the node equals m(m−1), and the assigned value for each connectivity ranking 214 and link value 620 for each edge that includes the node represent W and L, respectively, the API call heuristic relevance ranking 218 for the node may be determined according to Equation 1 above where m substitutes for n:

$$\sum_{j=1}^{m(m-1)} \frac{W_j L_j}{m(m-1)} \text{ where } j \text{ ranges from 1 to } m(m-1).$$

Figure 8:
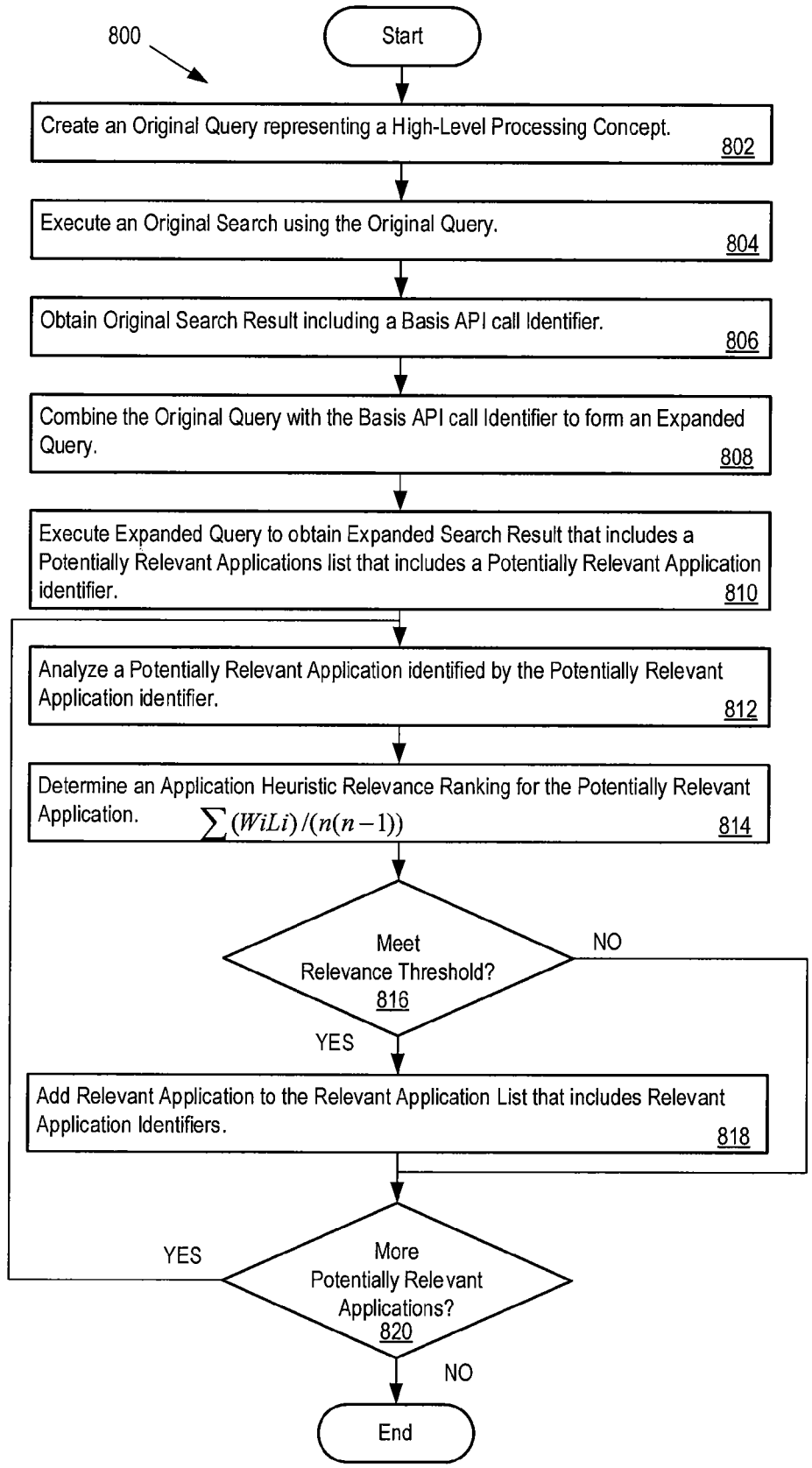
FIG. 8 shows the acts that the Exemplar system may take to obtain a relevant application list.

FIG. 8 shows the acts that the Exemplar system 124 may take to obtain a relevant application list 210. The Exemplar system 124 may use the interface logic 510 to receive an original query 202 representing a high-level processing concept (e.g., "send secure XML") (802). The help content processor 104 may execute an original search using the original query 202 (804) to obtain an original search result that includes basis logic results 516 (e.g., basis API call list 204 or basis application list 520). The basis logic results 516 may include a basis logic (e.g., API call) identifier (806). The Exemplar system 124 may combine the original query 202 with any part of the basis logic list to form an expanded query (808). The expanded search logic 514 may execute the expanded query 206 to obtain an expanded search result 208 that includes a potentially relevant applications 210 list and potentially relevant API calls 212 list (810). The potentially relevant logic list may identify potentially relevant logic. The analyzer logic 606 may analyze the potentially relevant logic identified by the potentially relevant application identifiers with respect to the logic repository 112 (812). The heuristic relevance ranking logic 602 may use the connectivity rankings 214, and link values 620 to determine the application heuristic relevance rankings 216 and API call heuristic relevance rankings 218 for the potentially relevant applications 210 and potentially relevant API calls 212 using Equation 1 or another formulation (814). The heuristic relevance ranking logic 602 may apply the application relevance threshold 428 and the API call relevance threshold 430 using the threshold logic 604 to determine whether the potentially relevant applications 210 and the potentially relevant API calls meet the application relevance threshold 428, and API call relevance threshold 430, respectively (816). The heuristic relevance ranking logic 602 may add the potentially relevant application 210 to the relevant application list 220 where the potentially relevant application 210 meets the application relevance threshold 428 (818). The heuristic relevance ranking logic 602 may determine the application heuristic relevance ranking 216 and API call heuristic relevance ranking 218 for each potentially relevant application 210 and potentially relevant API call 212 included the expanded search result 208 (820).

Figure 9:
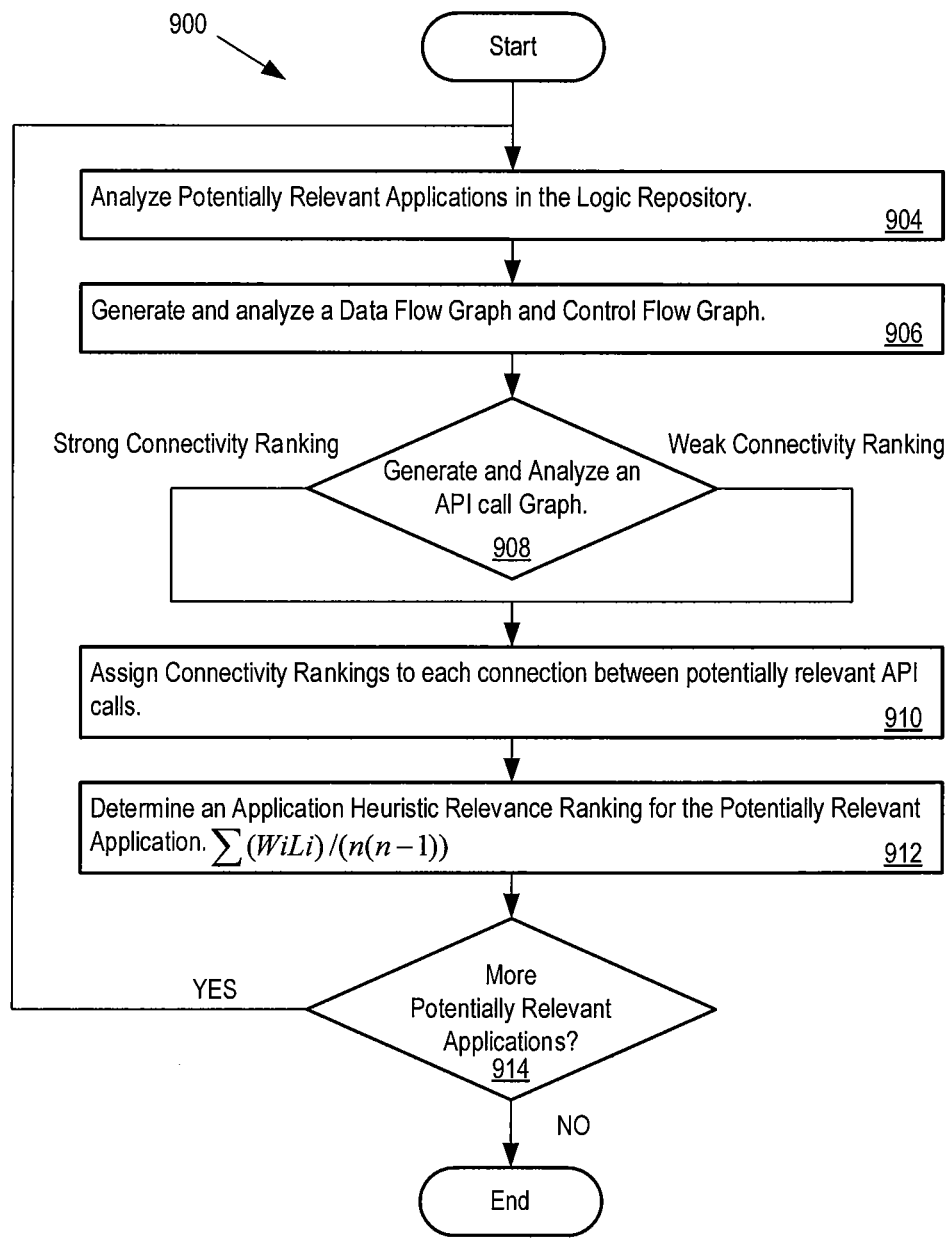
FIG. 9 shows the acts that the Exemplar system heuristic ranking engine may take to assign an application heuristic relevance ranking to a potentially relevant application.

FIG. 9 shows the acts that the Exemplar system 124 heuristic ranking engine 114 may take to assign an application heuristic relevance ranking 216 to a potentially relevant application 210. The analyzer logic 602 may analyze the potentially relevant application 210 and potentially relevant API calls 212 found in the logic repository (904). The analyzer logic 602 may generate and analyze a data flow graph 432 and control flow graph 433 (906) used to generate and analyze an API call graph 43 (908). The analyzer logic 602 may use the data flow graph 432, control flow graph 433, and API call graph to determine the link values 650 for the potentially relevant API calls included in a potentially relevant application 210 and assign a connectivity ranking 214 to each connection between potentially relevant API calls 212 (910). The heuristic relevance ranking logic 602 may determine an application heuristic relevance ranking 216 for each of the potentially relevant applications 210 (912) (e.g., the application heuristic relevance ranking 216 and an API call heuristic relevance ranking 218 may be determined according to Equation 1, as discussed above). The heuristic relevance ranking logic 602 may determine the application heuristic relevance ranking 216 and API call heuristic relevance ranking 218 for each potentially relevant application 210 and potentially relevant API call 212 included the expanded search result 208 (914).

Figure 10:
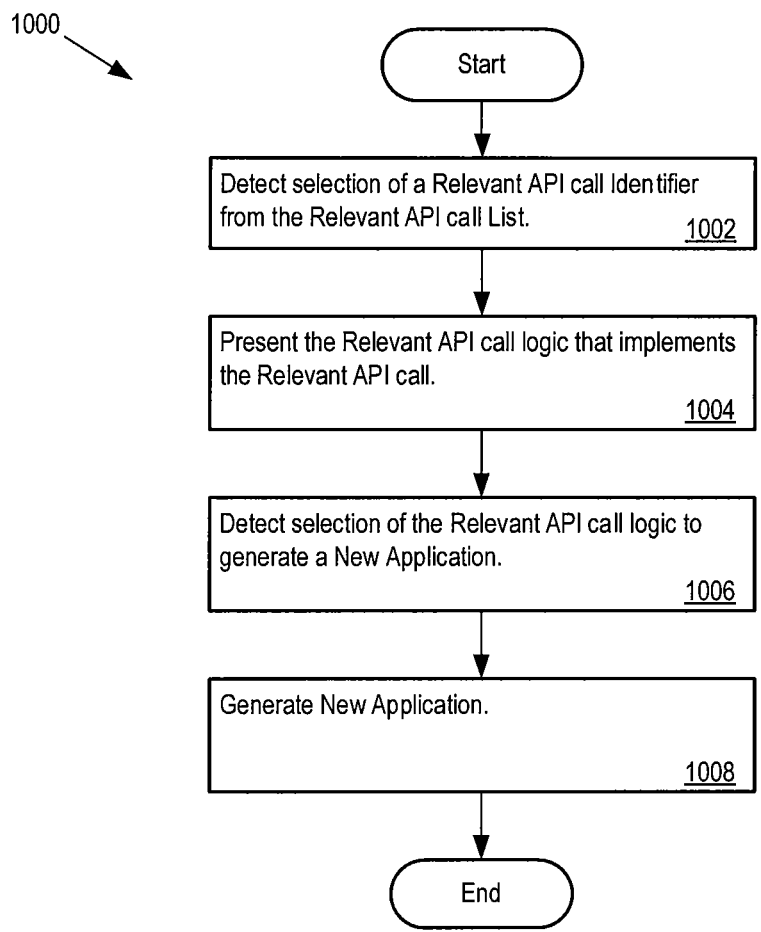
FIG. 10 shows the processing that the selection logic and application creation logic may take to generate a new application.

FIG. 10 shows the processing that the selection logic and application creation logic may take to generate a new application 440. EPAD project area 400 may use the selection logic 624 to detect selection of a relevant API call Identifier (e.g., as indicated by arrows 426 drawn from the relevant API call identifier-1 418 and the relevant API call identifier-2 420 to the relevant API call logic-1 422 and the relevant API call logic-2 424) from the relevant API call list 222 (1002). The EPAD project area 400 may present the relevant API call logic (e.g., the relevant API call logic-1 422 and the relevant API call logic-2 424) that implements the relevant API calls (1004). The EPAD project area may use the selection logic 624 to detect selection of the relevant API call logic (e.g., the relevant API call logic-1 422 and the relevant API call logic-2 424) and the other relevant application logic 436 to generate a new application 440 (1006). The EPAD project area may provide an option to generate the new application 440, using the application creation logic 626, following selection of the relevant API call logic (e.g., the relevant API call logic-1 422 and the relevant API call logic-2 424) and the other relevant application logic 436 to generate a new application 440 (1008). Exemplar system 124 may also identify requirements 444 for the high-level processing concept represented by the original query 202. In one implementation, Exemplar system 124 may generate requirements documentation and end user documentation based on the help content 106 related to the other relevant application logic 436, the relevant API call logic-1 422, and the relevant API call logic-2 424 combined to generate the new application 440 and identify the requirements 444.

Figure 11:
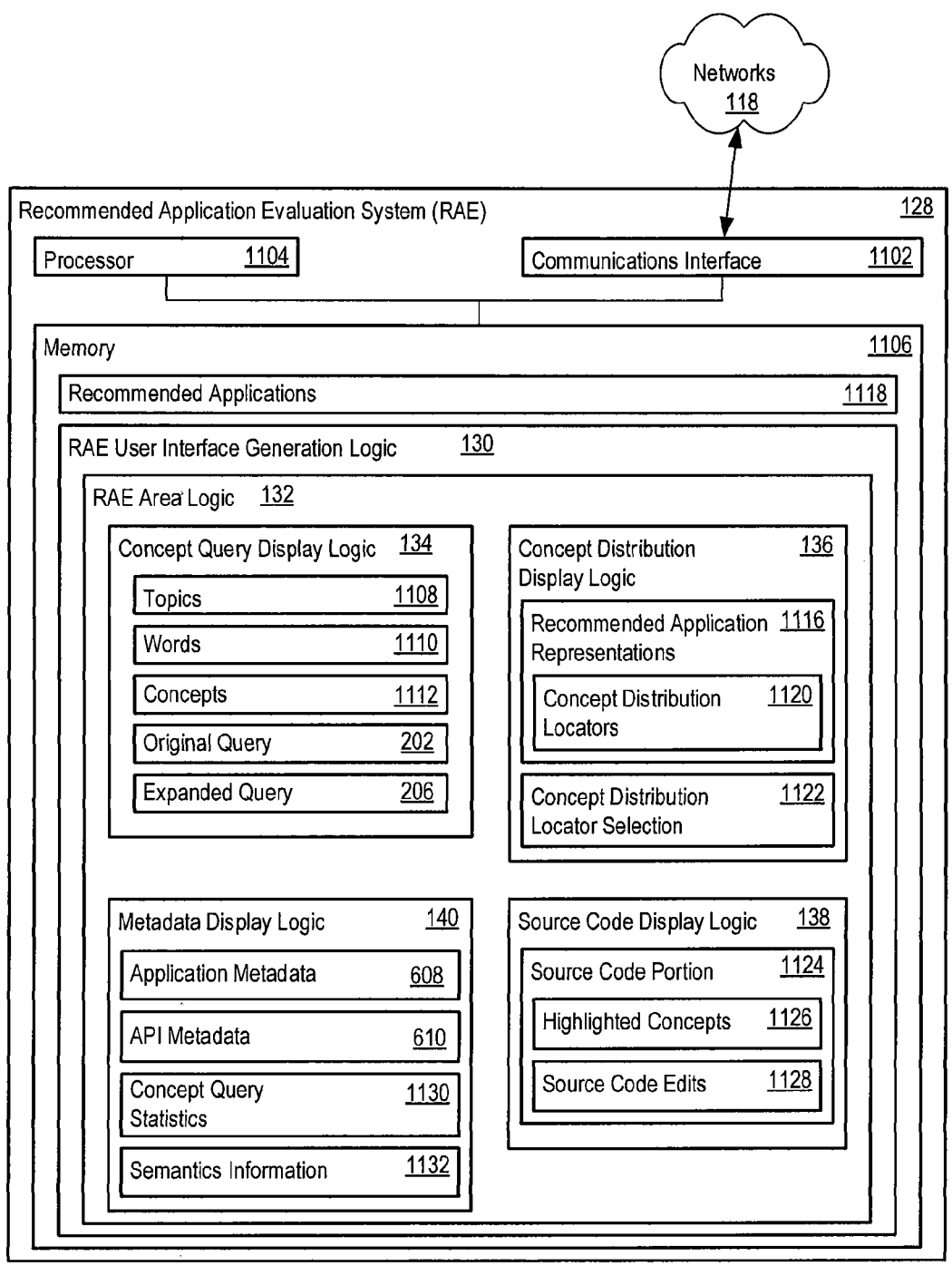
FIG. 11 shows a recommended application evaluation system (RAE).
Figure 12:
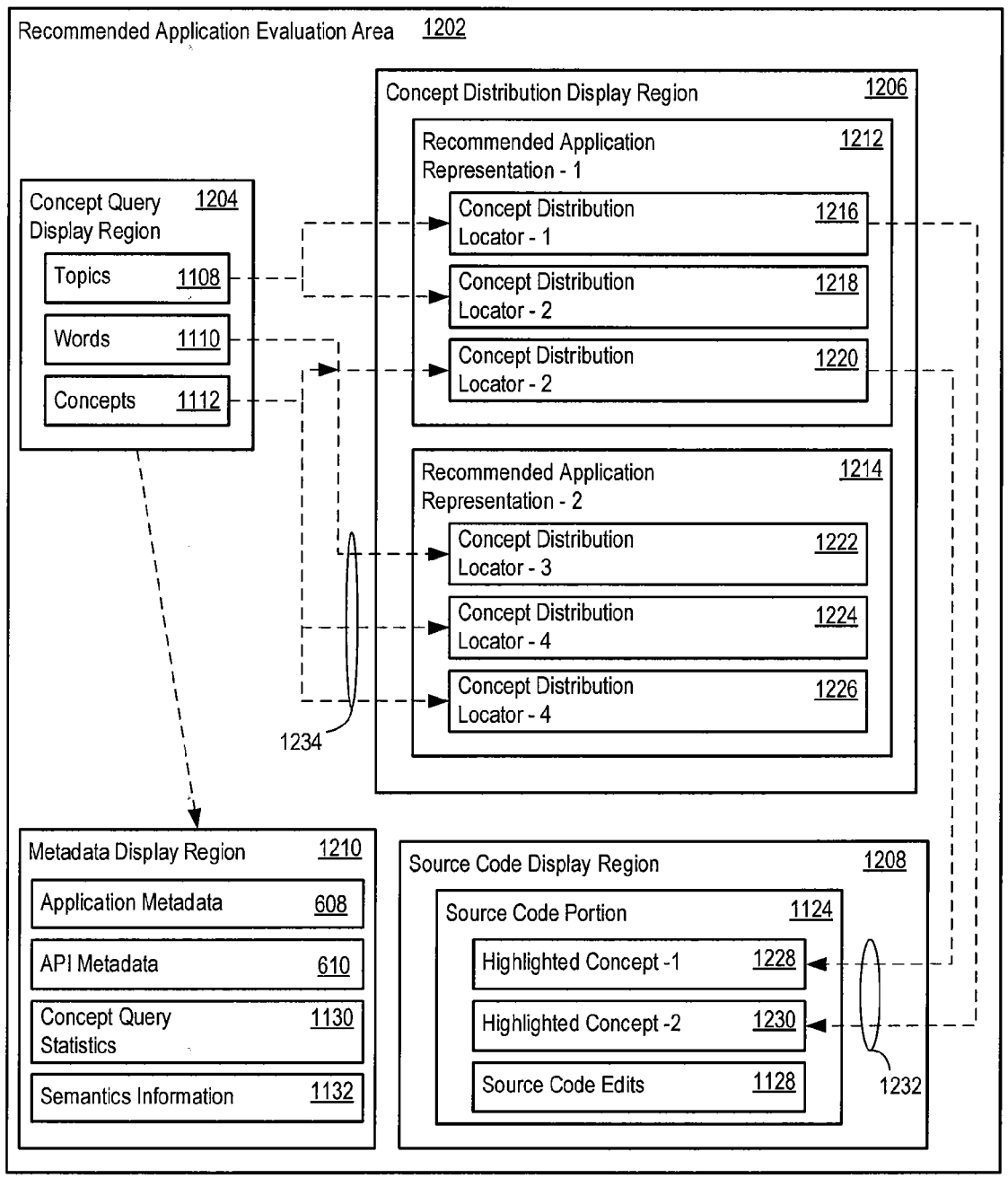
FIG. 12 shows a recommended application evaluation area.

FIG. 11 shows a recommended application evaluation system (RAE) 128. In one implementation, the RAE 128 includes a communications interface 1102 in communication with the network 118 and used to communicate with various resources internal and external to the RAE 128, a memory 1104, and a processor 1106. The processor 1106 may execute any of the logic of the RAE 128 and/or Exemplar 124. The memory 1106 may include the RAE user interface generation logic 130 that generates a RAE user interface 1202, as shown in FIG. 12, and employs the RAE area logic 132.

The RAE area logic 132 may include graphics libraries, window rendering calls, and other user interface logic operable to display interface elements, receive input, and pass the input to any particular program logic in the RAE 128. The RAE area logic 132 may further include the concept query display logic 134, the concept distribution display logic 136, the source code display logic 138 and the metadata display logic 140. The concept query display logic 134 may include topics 1108, words 1110, and concepts 1112 of the original query 202 and/or the expanded query 206. The concept query display logic 134 accepts the topics 1108, words 1110, concepts 1112, the original query 202 and the expanded query 206 from Exemplar, and generates a window in the RAE user interface 1202 (as described in more detail in connection with FIG. 12) that presents the topics as selectable focus items for verifying recommended application functionality.

The concept distribution display logic 136 may include recommended application representations 1116 of the recommended applications 1118 (e.g., HRAs). In one implementation, the recommended applications 1118 include the relevant application logic 414 and relevant API call logic (e.g., 422 and 424) obtained from Exemplar based on the original query 202 and/or the expanded query 206. The recommended application representations 1116 include concept distribution locators 1120 that identify potential implementation locations of one of the topics, concepts and words. Exemplar identifies the location (e.g., concept distribution locators) in application logic where an API call implements a high-level processing concept. The concept distribution display logic 136 generates a visualization of a recommended application. The concept distribution display logic 136 may, for example, generate a concept distribution display region 1206 that shows one or more of the modules, source code files, header files, library files, or other recommended application source files. The concept distribution display logic 136 further locates within the recommended application source files the API calls that implement the topics 1108, words 1110, concepts 1112, the original query 202 and the expanded query 206, selected by an operator. The concept distribution display logic 136 may denote each location with a concept distribution locator 1120, such as a solid horizontal line with hyperlink functionality through the recommended application source file at the location where the API call exists in the source file. Other concept distribution locators 1120 may be used such as geometric shapes (e.g., circles, squares) and (e.g., fonts, graphics (e.g., lines or pointers), color and/or sound).

The concept distribution display logic 136 is operable to receive concept distribution locator selections 1122. The concept distribution display logic 136 may convey the concept distribution locator selection 1122 to the source code display logic 138. As described in more detail below, the source code display logic 138 generates a source code display region on the user interface which displays the actual code at the selection point. As a result, an operator may evaluate the code to determine whether the code actually implements the search terms selected from the concept query display region.

The source code display logic 138 may include source code portions 1124 of a recommended application 1118. The source code portions 1124 may include the potential implementation location of source code (e.g., highlighted concepts 1126) for a selected concept distribution locator 1122. The source code display logic 138 accepts a concept distribution location selection 1122 from the concept distribution display logic 136. In response, the source code display logic 138 retrieves the recommended application code at the selection point and presents the source code for review in the source code display region. Furthermore, the concept distribution display logic 136 highlights source code components in the display such as API calls in the source code that match the concepts selected from the concept query display region. Accordingly, an operator may review the source code to determine whether the source code actually does implement the concepts selected from the concept query display region. The source code display logic 138 may include read-only and edit modes that allow the source code display logic 138 to be responsive to source code edits 1128 entered by a developer in the course of evaluating the recommended application 1118.

The metadata display logic 140 may include application metadata 608 and API metadata 610 for the recommended applications 1118 based on the topics 1108, words 1110, concepts 1112, the original query 202 and the expanded query 206. The metadata display logic 140 may also include concept query statistics 1130 and semantics information 1132 based on the topics 1108, words 1110, concepts 1112, the original query 202, the expanded query 206 and/or recommended applications 1118. In one implementation, concept query statistics 1130 and semantics information 1132 are determined by the heuristic relevance ranking engine 114 as a product of determining the API call heuristic relevance rankings 218 of the relevant API call logic-1 422 and the relevant API call logic-2 424, based on analyzing semantics derived from the expanded query 206 and the expanded search result 208.

FIG. 12 shows a recommended application evaluation area 1202 that the RAE area logic 132 may be operable to display. The RAE area 1202 may include a concept query display region 1204, a concept distribution display region 1206, source code display region 1214 and metadata display region 1210. The concept query display region 1204 displays the topics 1108, words 1110, concepts 1112 of the original query 202 and/or the expanded query 206 alone or in combination. The concept query display region 1204 may further include check boxes and/or other selection GUI elements so that an operator may select the topics 1108, words 1110, and concepts 1112 from the concept query display region 1204.

The concept distribution display region 1206 displays the recommended application representations (RAR) 1212 and 1214 of a recommended application 1118. For example, the RAR 1212 may represent the source code file that includes the main( ) function, while the RAR 1214 may represent the source code file with an alleged JPEG to BITMAP conversion routine. The recommended application representations 1212 and 1214 include concept distribution locators 1216, 1218, 1220, 1222, 1224, and 1226 inserted by the concept distribution display logic 136 that identify potential implementation locations in the source code files of the topics 1108, words 1110, concepts 1112, the original query 202 and the expanded query 206 alone or in combination. The concept distribution locators 1216, 1218, 1220, 1222, 1224, and 1226 may employ different identifiers (e.g., fonts, graphics (e.g., lines or pointers), color and/or sound) to identify a relationship between the concept distribution locators and the topics 1108, words 1110, concepts 1112 of the original query 202 and the expanded query 206. The source code display region 1208 includes highlighted concepts 1126 (e.g., 1228 and 1230). In one implementation, the highlighted concepts 1126 (e.g., 1228 and 1230) include identifiers (e.g., fonts, color and/or sound) to indentify a relationship between the highlighted concepts 1126 and the concept distribution locators (e.g., 1216, 1218, 1220, 1222, 1224, and 1226). The RAE area logic 132 may use fonts, color and/or sound (e.g., audio queues) to indicate relationships between the topics 1108, words 1110, concepts 1112, concept distribution locators (e.g., 1216, 1218, 1220, 1222, 1224, and 1226) and highlighted concepts 1126, as indicated by the arrows 1232 and 1234.

In one implementation, the recommended application representations (1116, 1212 and 1214) and/or the concept distribution locators (e.g., 1216, 1218, 1220, 1222, 1224, and 1226) are displayed in response to the selection of a particular topic 1108, word 1110, concept 1112, and/or element of the original query 202 and/or the expanded query 206. In other words, the recommended application representations (1116, 1212 and 1214) and/or the concept distribution locators (e.g., 1216, 1218, 1220, 1222, 1224, and 1226) displayed in the concept distribution display region 1206 may be responsive to selections made in the concept query display region 1204.

Figure 13:
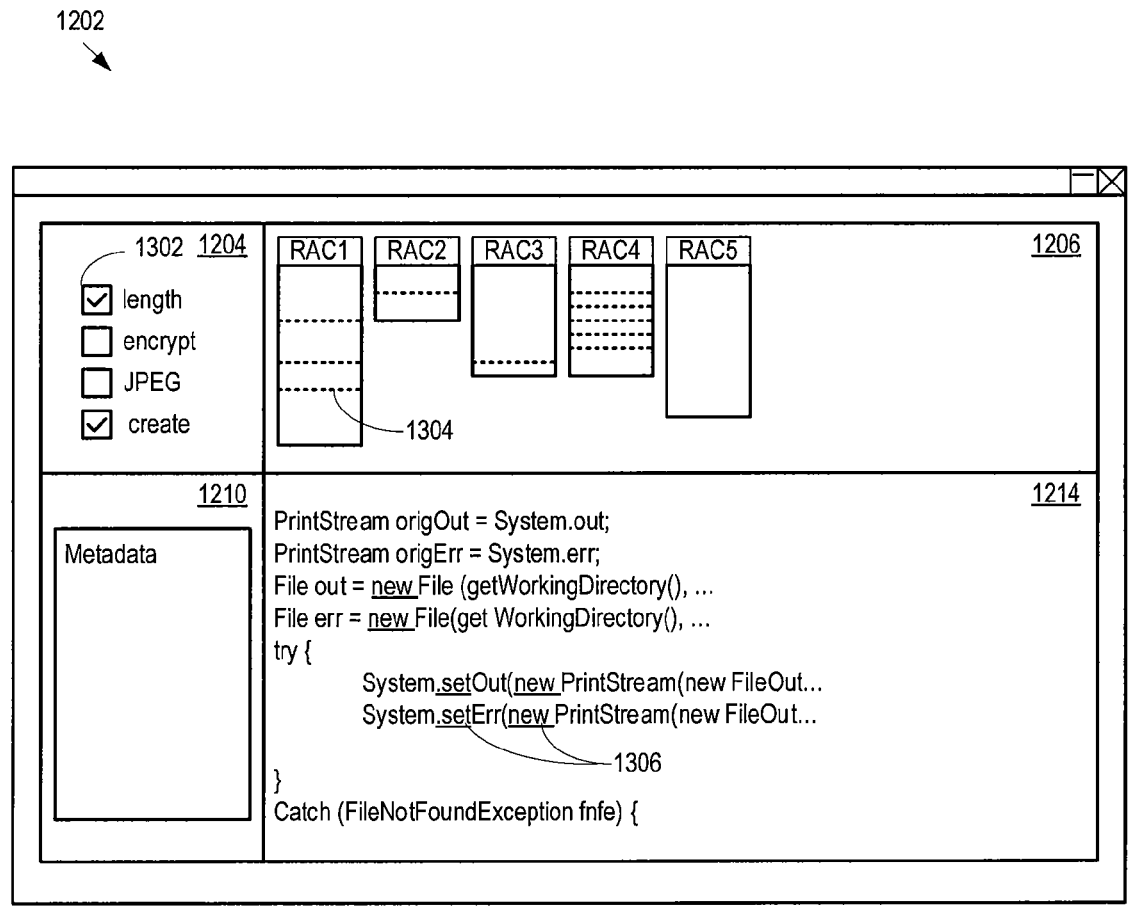
FIG. 13 shows an example of the recommended application evaluation area.

FIG. 13 shows an example of the recommended application evaluation area 1202 as shown on a display. The recommended application evaluation area 1202 includes the concept query display region 1204, concept distribution display region 1206, a recommended application representation 1214, and a metadata display region 1210. The concept query display region 1204 provides term selection elements 1302 that an operator may select to chose the concepts of interest for verification in the recommended applications. The concept distribution display region 1206 shows the location of API calls and other source code components that implement the selected terms. In the example shown in FIG. 13, the locations are indicated using concept distribution locators: dashed lines (e.g., 1304) proportionally positioned within graphical representations of the source code files that make up a recommended application. These source code files are labelled Recommended Application Code (RAC) file 1 (RAC1), RAC2, RAC3, RAC4, and RAC5 in FIG. 13.

The recommended application representation 1214 shows the source code at a specific concept location in a specific source code file, as selected by an operator. Thus, when an operator selects, for example, RAC1, and the concept distribution locator 1304, the concept distribution display logic 136 responds by retrieving the RAC1 source code at and around the concept location. The concept distribution display logic 136 displays the retrieved code in the recommended application representation 1214 area. Furthermore, the concept distribution display logic highlights the sections of code that Exemplar's search techniques determined relate to the search terms shown in the concept query display region 1204. As shown in FIG. 13, for example, the concept distribution display logic 136 has highlighted (using underlining) the source code components 1306 "new" and ".set" as relevant to the selected search terms "length" and "create" in the concept query display region 1204.

Figure 14:
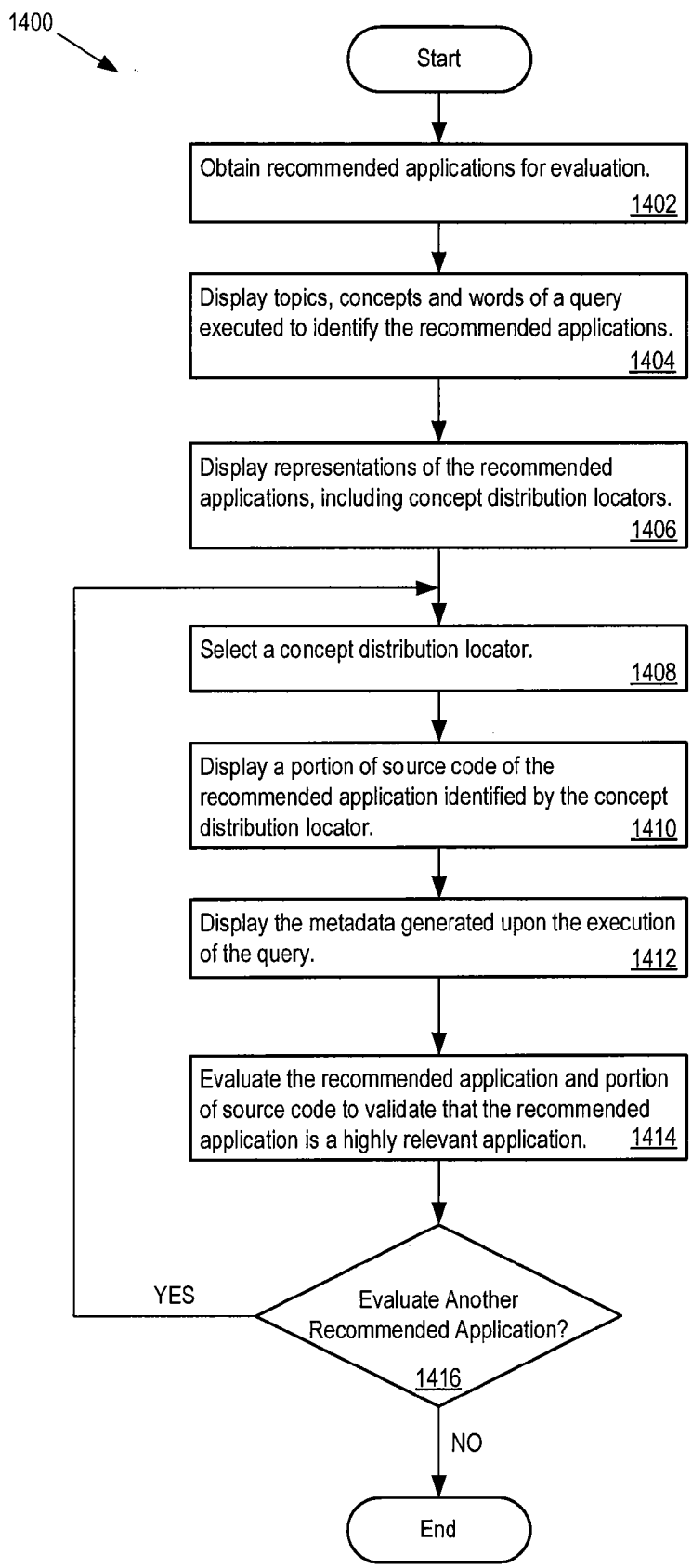
FIG. 14 shows the processing that the RAE area logic may take to evaluate a recommended application.

FIG. 14 shows the processing that the RAE area logic 132 may take to evaluate a recommended application. The RAE area logic 132 obtains recommended applications for evaluation (1402). In one implementation, the RAE area logic 132 obtains the recommended applications for evaluation from Exemplar 124, where the recommended applications 1118 are HRAs. The concept query display logic 134 displays the topics, concepts and words of the original query 202 and/or the expanded query 206 executed to identify the recommended applications (1404). The concept query display logic 134 displays the topics, concepts and words in a concept query display area. The concept distribution display logic 136 displays representations of the recommended applications 1118, including concept distribution locators 1120 in the concept distribution display region 1206 (1406). The concept distribution locators 1120 identify potential implementation locations of the topics, concepts and words of the query executed to identify the recommended applications 1118. When a concept distribution locator 1120 is selected from the concept distribution display region 1206 (1408) the source code display logic 138 displays a portion of the source code 1124 of the recommended application identified by the concept distribution locator 1120 (1410) in the source code display region. The metadata display logic 140 displays the metadata generated upon the execution of the query executed to identify the recommended applications (1412). A developer may use the RAE 128 to evaluate the recommended application and portion of source code to validate that the recommended application is a highly relevant application (1414). The developer may select another recommended application to evaluate (1416) by selecting another concept distribution locator from the concept distribution display area.

The RAE 128 greatly reduces the time, cost, and other resource expenditures associated with evaluating a recommended application. The RAE 128 produces relevant results starting with high-level processing concepts. A software developer may deploy the highly relevant application into production upon successful evaluation.

Furthermore, it is noted that the system carries out electronic transformation of data that may represent underlying physical objects. For example, the RAE area logic visually transforms source code by adding search term locators and highlighting of relevant code that matches search terms. In addition, the RAE may be implemented as a particular machine. For example, the particular machine may include a CPU, memory, and a software library for carrying out the RAE area logic noted above.

A number of implementations have been described. Nevertheless, it will be understood that various modifications may be made without departing from the spirit and scope of the invention. Accordingly, other implementations are within the scope of the following claims.

What is claimed is:

1. A product comprising:
a machine readable medium other than a transitory signal; and
application evaluation logic stored on the machine readable medium that when executed by a processor causes the processor to:
identify an application, where the application comprises source code;
generate a recommended application evaluation area for reviewing the application, the recommended application evaluation area comprising multiple distinct sub-regions, each sub-region assigned to a particular display task that facilitates evaluation of the application;
present, as a first sub-region within the recommended application evaluation area, a concept query display region, and display query terms in the concept query display region wherein the query terms are associated with a first query or a second query collectively used to identify the application, wherein the first query is performed against only help documentation that provides trusted descriptions of API calls, and further wherein the second query includes the first query and an Application Programming Interface (API) descriptor retrieved from a first set of search results corresponding to the first query;
present, as a second sub-region within the recommended application evaluation area, a concept distribution display region with a graphical representation of the application, where the graphical representation comprises a concept distribution locator that graphically identifies an implementation location within the source code of a selected term among the query terms;
present, as a third sub-region within the recommended application evaluation area, a source code display region responsive to a selection of the concept distribution locator, and display in the source code display region a selected portion of the source code from the application for the implementation location within the application of the selected term;
highlight, in the source code display region, selected source code components within the selected portion of the source code that the processor determined were relevant to the selected term; and
present, as a fourth sub-region within the recommended application evaluation area, a metadata display region, and display, within the metadata display region, metadata identified for the application, the metadata including semantics information for the application found in the help documentation, and the API descriptor.

2. The product of claim 1, where the concept query display region comprises search terms and search selectors.

3. The product of claim 1, where the graphical representation of the application comprises multiple source code file representations.

4. The product of claim 3, where the multiple source code file representations represent individual source code files which implement the application.

5. The product of claim 1, where the source code display region comprises highlighting for the selected term in the portion of the source code.

6. An application evaluation system comprising:
a processor; a memory in communication with the processor, the memory configured to store, for execution by the processor comprising:
application evaluation instructions that when executed by a processor causes the processor to:
identify an application, where the application comprises source code;
generate a recommended application evaluation area for reviewing the application, the recommended application evaluation area comprising multiple distinct sub-regions, each sub-region assigned to a particular display task that facilitates evaluation of the application;
present, as a first sub-region within the recommended application evaluation area, a concept query display region, and display query terms in the concept query display region wherein the query terms are associated with a first query or a second query collectively used to identify the application, wherein the first query is performed against only help documentation that provides trusted descriptions of API calls, and further wherein the second query includes the first query and an Application Programming Interface (API) descriptor retrieved from a first set of search results corresponding to the first query;
present, as a second sub-region within the recommended application evaluation areal a concept distribution display region with a graphical representation of the application, where the graphical representation comprises a concept distribution locator that graphically identifies an implementation location within the source code of a selected term among the query terms;
present, as a third sub-region within the recommended application evaluation area, a source code display region responsive to a selection of the concept distribution locator, and display in the source code display region a selected portion of the source code from the application for the implementation location within the application of the selected term;
highlight, in the source code display region, selected source code components within the selected portion of the source code that the processor determined were relevant to the selected term; and
present, as a fourth sub-region within the recommended application evaluation area, a metadata display region, and display, within the metadata display region, metadata identified for the application, the metadata including semantics information for the application found in the help documentation, and the API descriptor.

7. The system of claim 6, where the concept query display region comprises search terms and search term selectors.

8. The system of claim 6, where the graphical representation of the application comprises multiple source code file representations.

9. The system of claim 8, where the multiple source code file representations represent individual source code files which implement the application.

10. The system of claim 6, where the source code display region comprises highlighting for the selected term in the portion of the source code.

11. A method comprising:
identifying an application, where the application comprises source code;
generating a recommended application evaluation area in a graphical user interface on a machine for reviewing the application the recommended application evaluation area comprising multiple distinct sub-regions, each sub-region assigned to a particular display task that facilitates evaluation of the application;
presenting, as a first sub-region within the recommended application evaluation area, a concept query display region, and display query terms in the concept query display region wherein the query terms are associated with a first query or a second query collectively used to identify the application, wherein the first query is performed against only help documentation that provides trusted descriptions of API calls, and further wherein the second query includes the first query and an Application Programming Interface (API) descriptor retrieved from a first set of search results corresponding to the first query;
presenting, as a second sub-region within the recommended application evaluation area, a concept distribution display region with a graphical representation of the application, where the graphical representation comprises a concept distribution locator that graphically identifies an implementation location within the source code of a selected term among the query terms;
presenting, as a third sub-region within the recommended application evaluation area, a source code display region responsive to a selection of the concept distribution locator, and display in the source code display region a selected portion of the source code that includes the implementation location within the application of the selected term;
highlighting, in the source code display region, selected source code components within the selected portion of the source code that the processor determined were relevant to the selected term; and
presenting, as a fourth sub-region within the recommended application evaluation area, a metadata display region, and displaying, within the metadata display region, metadata identified for the application, the metadata including semantics information for the application found in the help documentation, and the API descriptor.

12. The method of claim 11, further comprising displaying, in the concept query display region, search terms and search term selectors.

13. The method of claim 11, further comprising displaying, in the graphical representation of the application, multiple source code file representations.

14. The method of claim 13, where the multiple source code file representations are generated based on individual source code files which implement the application.

15. The method of claim 11, further comprising displaying, in the source code display region, term highlighting in the portion of the source code.

16. The product of claim 1, wherein the concept distribution locator graphically identify relationships between the concept distribution locator and the query term.

17. The product of claim 1, wherein the concept distribution locator comprises a graphical object proportionally positioned in a graphical representation of the application.

18. The system of claim 6, wherein the concept distribution locator comprises a graphical identifier a relationship between the concept distribution locator and the query terms.

19. The system of claim 6, wherein the concept distribution locator comprises a graphical object proportionally positioned in a graphical representation of the application.

20. The method of claim 11, wherein the concept distribution locator graphically identify relationships between the concept distribution locator and the query term.

21. The method of claim 11, wherein the concept distribution locator comprises a graphical object proportionally positioned in a graphical representation of the application.

* * * * *